US008187004B1

(12) United States Patent
DeSensi, Jr. et al.

(10) Patent No.: US 8,187,004 B1
(45) Date of Patent: May 29, 2012

(54) SYSTEM AND METHOD OF EDUCATION ADMINISTRATION

(76) Inventors: Francis Joseph DeSensi, Jr., Louisville, KY (US); Francis DeSensi, III, Prospect, KY (US); Joseph Ronald Hagan, Prospect, KY (US)

( * ) Notice: Subject to any disclaimer, the term of this patent is extended or adjusted under 35 U.S.C. 154(b) by 1140 days.

(21) Appl. No.: 10/934,652

(22) Filed: Sep. 3, 2004

(51) Int. Cl.
G09B 25/00 (2006.01)

(52) U.S. Cl. ........ 434/365; 434/118; 434/156; 434/322; 434/323; 434/350; 434/353; 434/362; 705/1.1; 705/7.38; 705/7.39; 707/792; 707/802

(58) Field of Classification Search .................. 434/118, 434/350, 362, 156, 322, 323, 353, 365; 705/1.1, 705/7.38, 7.39; 707/792, 802
See application file for complete search history.

(56) References Cited

U.S. PATENT DOCUMENTS

| 4,820,167 | A | | 4/1989 | Nobles et al. |
| 5,267,865 | A | | 12/1993 | Lee et al. |
| 5,311,422 | A | | 5/1994 | Loftin et al. |
| 5,452,379 | A | * | 9/1995 | Poor ............................ 382/317 |
| 5,672,060 | A | * | 9/1997 | Poor ............................ 434/322 |
| 5,727,950 | A | * | 3/1998 | Cook et al. .................... 434/350 |
| 5,810,605 | A | | 9/1998 | Siefert |
| 5,829,983 | A | | 11/1998 | Koyama et al. |
| 5,842,182 | A | * | 11/1998 | Bonner et al. .................. 705/32 |
| 5,861,810 | A | | 1/1999 | Nguyen |
| 5,864,869 | A | | 1/1999 | Doak et al. |
| 5,934,909 | A | * | 8/1999 | Ho et al. ....................... 434/362 |
| 5,963,134 | A | * | 10/1999 | Bowers et al. ............... 340/572.1 |
| 5,978,648 | A | | 11/1999 | George et al. |
| 5,987,149 | A | * | 11/1999 | Poor ............................ 382/100 |
| 5,987,302 | A | * | 11/1999 | Driscoll et al. ................ 434/353 |
| 6,092,081 | A | | 7/2000 | Alpert et al. |
| 6,234,806 | B1 | * | 5/2001 | Trenholm et al. .............. 434/322 |
| 6,270,351 | B1 | * | 8/2001 | Roper ........................... 434/118 |
| 6,315,572 | B1 | * | 11/2001 | Owens et al. .................. 434/322 |
| 6,322,366 | B1 | * | 11/2001 | Bergan et al. .................. 434/118 |
| 6,347,333 | B2 | | 2/2002 | Eisendrath et al. |
| 6,386,883 | B2 | | 5/2002 | Siefert |
| 6,496,681 | B1 | | 12/2002 | Linton |
| 6,554,618 | B1 | | 4/2003 | Lockwood |
| 6,606,479 | B2 | | 8/2003 | Cook et al. |
| 6,643,493 | B2 | * | 11/2003 | Kilgore ......................... 434/350 |
| 6,651,216 | B1 | * | 11/2003 | Sullivan et al. ............... 715/205 |

(Continued)

OTHER PUBLICATIONS

Blackboard Inc, Blackboard Learning System—Instructor Manual Release 6 Blackboard Learning System Blackboard Learning and Community Portal Systems Blackboard Learning System—Basic Edition, Jul. 8, 2003, pp. 209-259.*

(Continued)

*Primary Examiner* — Xuan Thai
*Assistant Examiner* — Jack Yip
(74) *Attorney, Agent, or Firm* — John F. Salazar; Scott W. Higdon; Middleton Reutlinger

(57) ABSTRACT

A system including electronic data collection for school officials, staff, and administrators is described. The data collection system can be integrated onto school management systems to interconnect information regarding data such as student academic records, student merits, student progress, student and teacher biographies, etc. The system assesses student, teacher, classroom, individual school, school district, and state performance in a variety of educational area; associates imputed educational data; and permits the cross-application querying of the educational data and access of the educational data in real-time. The system is intended to help school systems accomplish tasks such as managing work, monitoring student progress in real-time, and determining education trends, via data linkage in real-time.

69 Claims, 11 Drawing Sheets

U.S. PATENT DOCUMENTS

| | | | |
|---|---|---|---|
| 6,678,499 B1 * | 1/2004 | Silverbrook et al. | 434/350 |
| 6,751,440 B2 * | 6/2004 | Sugimoto | 434/362 |
| 6,772,081 B1 * | 8/2004 | Gedlinske et al. | 702/108 |
| 6,778,807 B1 * | 8/2004 | Martino et al. | 434/362 |
| 6,810,232 B2 * | 10/2004 | Knowles et al. | 434/353 |
| 6,813,474 B2 * | 11/2004 | Robinson et al. | 434/353 |
| 6,898,590 B1 * | 5/2005 | Streifer | 1/1 |
| 6,960,088 B1 * | 11/2005 | Long | 434/322 |
| 6,988,096 B2 * | 1/2006 | Gupta et al. | 1/1 |
| 7,050,753 B2 * | 5/2006 | Knutson | 434/350 |
| 7,051,038 B1 * | 5/2006 | Yeh et al. | 707/603 |
| 7,311,524 B2 * | 12/2007 | Jennen et al. | 434/323 |
| 2002/0032708 A1 * | 3/2002 | Gupta et al. | 707/539 |
| 2002/0045155 A1 * | 4/2002 | Sugimoto | 434/362 |
| 2002/0078067 A1 * | 6/2002 | Collins et al. | 707/104.1 |
| 2002/0110796 A1 * | 8/2002 | Sugano et al. | 434/350 |
| 2002/0110797 A1 * | 8/2002 | Poor | 434/353 |
| 2002/0122606 A1 * | 9/2002 | Knowles | 382/305 |
| 2002/0169822 A1 * | 11/2002 | Packard et al. | 709/203 |
| 2002/0178038 A1 * | 11/2002 | Grybas | 705/7 |
| 2003/0017442 A1 * | 1/2003 | Tudor et al. | 434/322 |
| 2003/0031996 A1 * | 2/2003 | Robinson | 434/350 |
| 2003/0104344 A1 * | 6/2003 | Sable et al. | 434/178 |
| 2003/0113697 A1 * | 6/2003 | Plescia | 434/322 |
| 2003/0134261 A1 * | 7/2003 | Jennen et al. | 434/354 |
| 2004/0110119 A1 * | 6/2004 | Riconda et al. | 434/350 |
| 2004/0180317 A1 * | 9/2004 | Bodner et al. | 434/353 |
| 2004/0219502 A1 * | 11/2004 | Bechard et al. | 434/322 |
| 2004/0229199 A1 * | 11/2004 | Ashley et al. | 434/323 |
| 2005/0048458 A1 * | 3/2005 | Collins et al. | 434/323 |
| 2005/0086257 A1 * | 4/2005 | Wright | 707/103 R |
| 2005/0142529 A1 * | 6/2005 | Andreyev et al. | 434/362 |
| 2007/0238084 A1 * | 10/2007 | Maguire et al. | 434/353 |

OTHER PUBLICATIONS

WebCT Vista, "Designer and Instructor Reference Manual for WebCT Vista 2.1", Aug. 29, 2003, p. 1-697.*

Riconda, "Web-Based Public Education Knowledge Management System", Sep. 3, 2003, p. 1-531.*

* cited by examiner

SYSTEM AND METHOD OF EDUCATION ADMINISTRATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

The present invention relates generally to educational management systems, and more particularly to a system adapted to school administrations for managing work, monitoring student progress, and determining educational trends.

2. Description of the Related Art

In a traditional setting, educators manually record homework, grades, quizzes, writing samples, etc., and submit the results to school officials and administrators, which, in turn, manually submit student, class, and school progress to the state level. Each teacher does this independently, so other teachers and school administrators have no formal mechanism for monitoring a student's progress with respect to student performance in all areas of education. Grades submitted for report cards give administrators, teachers, parents, and students an idea of how well a student performs in a given subject area for a given period of time. However, administrators do not have real-time information or knowledge with which to work. Additionally, some basic information gathered by a school might be sent to a region or to the state, but little useful information is generated at the classroom level.

Computer programs for educational purposes are known. For example, U.S. Pat. No. 6,496,681, issued to Linton, teaches a teaching, evaluating, and reporting computer system and method. Linton teaches a computer system that implements skills assessment and knowledge, manages the instructional segment, and provides the verification, evaluation, teaching, and reporting of the user's activity with the instructional segment. A managing system has means for broadcasting the instructional segment to a user, a means for evaluating the user's comprehension of the subject matter, and a means for reporting the user's results of the instructional segment back to an administrator.

Also, U.S. Pat. No. 6,386,883, issued to Siefert, teaches a computer-assisted education, in which a school curriculum is stored in computer repositories. Each student has a learning profile that indicates the student's capabilities, preferred style of learning, and progress. Based on this profile, an "Intelligent Administrator" selects the appropriate material for presentation during each learning session, assesses the student's performance, and then presents the material in a different way if the student has failed to master the material.

Furthermore, U.S. Pat. No. 6,092,081, issued to Alpert et al., teaches a computer system and method for storing and accessing information regarding digital portfolio projects. Alpert et al., teaches a system with a memory, a graphical user interface, and a tagging process whereby a quality weight is associated with the tag and the quality weight measures the performance of the portfolio author. After an author has submitted a portfolio entry, an evaluator selects tags (e.g., words that would be expected to be in the portfolio entry), and the selected tags are associated with the submitted portfolio entry. Alpert et al., further teaches tagged portions of the portfolio entry that are annotated by a comment selected by the evaluator from a Standardized set of evaluator comments by the respective tags.

Next, U.S. Pat. No. 5,810,605, issued to Siefert, teaches a system of educating students including repositories that hold interactive educational programs which students can access from home, via a network. Siefert also teaches learning profiles for individual students, which contain information such as student curriculum, preferred teaching strategies, present student standing, and any other significant personalized information to assist in the monitoring of student progress.

U.S. Pat. No. 5,267,865, issued to Lee, teaches an interactive and audio-visual system to encourage students to learn at their individual pace through administrative monitoring of the students' interaction with the system. Lee teaches an interactive educational method whereby students are provided with individual workstations linked via system bus, and all workstations are in constant communication with a teacher's workstation via a LAN interface. Lee teaches a system in which courseware is loaded into the workstation and is uniquely developed for each class, school, school system, or any segment of the student population so as to provide a curriculum desired by the educators using the system and method of the present invention. Students can enter their homework assignments manually by typing their answers into the workstation keyboard, and the answers are compared to the expected answers, transferred to the teacher's workstation, and stored for future use, such as to track student progress.

Last, U.S. Pat. No. 4,820,167, issued to Nobles et al., teaches an integrated system which includes a central school computer for outputting information to classroom computers, teacher computers, and individual student computers. Nobles et al., teaches individual computers called "student units" that have "read" and "test" modes, and these units can be connected to the classroom computers and teacher computers. Students use their individual computer units to do homework, study, and take tests in a variety of subjects, and connect their student unit to the teacher unit for grading and attendance.

An object of the present invention is to develop a system that can associate imputed educational data and achieve the cross-application querying of the educational data, and that has the ability to access the educational data in real-time via a "data linkage" process, whereby states, districts, schools, teachers, students, courses, and classes each have their own ID.

An object of the present invention is to develop a system to manage not only student progress but also school system (e.g., a school district) progress.

An object of the present invention is to develop a system to monitor student and school system progress and associate and track this data against local, state, and federal standards.

An object of the present invention is to develop a system that assists school systems in managing work, monitoring student progress, and determining educational trends, and associates and tracks all the imputed data against local, state, and federal standards.

The present inventive system includes a tracking system whereby each student has multiple portfolio entries, each with a unique ID, and each portfolio entry has multiple scorings and multiple files with descriptions attached, each with a unique ID.

The present inventive system can track these portfolio entries by entry, by student, by teacher, by class, by school, by district, or by state.

The present inventive system further includes a quiz manager, which runs a report for how a classroom performed as a whole on a quiz, how a particular teacher's classes performed on a quiz, how individual students performed on a quiz, and how the school, district, and state performed on a quiz.

The present inventive system includes standards managers, which define certain standards and benchmarks students must achieve through the writing portfolio and quiz entries.

Also, the present inventive system maintains data compilation of quiz grades, writing portfolio entries, attendance records, teacher biographies, and other administrative matters continually throughout the semester to maximize time and decrease excessive workloads.

SUMMARY OF THE INVENTION

In view of known deficiencies associated with prior educational management systems, an education management system is provided to assess student, teacher, classroom, school, district, and state performance in a variety of educational areas. The system provides for three individual systems which can work separately or together. Standards Managers, Scrimmage Manager, and Writing Portfolio Manager can be installed, either individually or together, and interfaced into a school's management system to interconnect information regarding such things as student academic records, student schedules and merits, extracurricular activities, teacher biographies, class rosters and attendance, etc. The system is intended to help school systems accomplish tasks such as managing work, monitoring student progress, and determining education trends, instantaneously and in real-time.

The system itself includes a central processor (i.e., control station or software relational database) for storing, processing, and accessing information pertaining to the administration of education. The central processor runs on a web-server and can be out on the internet, within a school-wide area network, within a school's local network, or even on a stand alone machine.

The process of data linkage is key and is accomplished via the use of unique identifications (hereinafter "IDs"). Each state has an ID; states have multiple districts which each have an ID; districts have schools which each have an ID; schools have courses, teachers, and students, each having an ID; and courses, teachers, and students come together to form classes which each have an ID. All IDs are unique. Standards Managers, Scrimmage Manager, and Writing Portfolio Manager can all share an optional core module, such as Administrator's Information Manager (AIM), which is a school management package which coordinates demographic data on students, parents, and teachers, as well as class schedules, course information, contact management, grant tracking, special event tracking, extracurricular and/or athletic involvement, transcripts, and college contact information, among other information. Schools that use AIM or want to use AIM can "hook" any or all of the Managers into AIM; AIM is not necessary for the instant invention but can add useful sets of data for cross-application query reports. Cross-application query reports can be run among Standards Managers, Scrimmage Manager, and Writing Portfolio Manager. Though all different products, they are all pieces of a large, normalized, and comprehensive database architecture. For example, a query could be run against portfolios with a parameter regarding scrimmages (i.e., quizzes) and displaying relevant "Standards" information, to yield a report.

Standards are benchmarks students are expected to meet throughout their education. Standards make it clear to teachers, students, and parents what knowledge, understanding, and skill students should acquire at particular grade levels. For example, kindergarten children in the state of Indiana should be able to have a sense of numbers in math, and they should be able to compare the number of objects in a given set and divide the set into equal groups. Whether a student has met a particular Standard is determined by a Standard "indicator", which is essentially a checklist of certain activities that a child should be able to accomplish, in order to meet that Standard. For example, to obtain the Standard just described, a student has nine indicators which he must meet, including comparing sets of up to ten objects and identifying whether one set is equal to, more than, or less than another, and dividing sets of ten or fewer objects into equal groups (i.e., a child must be able to take six blocks and give the same number to each of three other children to meet the Standard indicator.)

Generally, Standards Managers, Scrimmage Manager, and Writing Portfolio Manager can help schools determine what students know, what students can do with what they know, at what level are the students, and whether student performance is consistent with the assessment used to measure student performance. More specifically, Standards Managers, Scrimmage Manager, and Writing Portfolio Manager can run reports to answer questions such as the following, for example:

1. How many cheerleaders are having trouble in math or how many volleyball players are having trouble in science?
2. Do members of the Math Club perform better in math than non-members?
3. What is the average writing score for students broken down by race, gender, and teacher?
4. What students have not achieved minimum Standards? How many of those students are also struggling with writing and scrimmages?
5. What is the plagiarism rate for students involved in extracurricular activities? Is there a group of students participating in a particular activity showing similar trends in plagiarism?

The system of the present invention associates imputed educational data (e.g., portfolio entries and quiz grades) and permits the cross application querying of the educational data and access of the educational data in real-time. The present invention provides for an education administration system to assess student, teacher, classroom, school, district, and state performance and progress in a variety of educational areas. Instead of having to wait months to determine student performance and progress, performance and progress can be determined throughout the semester, at any point in time, instantaneously and in real-time. Also, the system saves school administrators and teachers time from having to constantly manually assess student progress or access student information, as the data will be easily accessible and convenient via a software relational database. Furthermore, paperwork burden is reduced substantially, as the interactive system provides a flexible student monitoring system.

Standards Managers track student progress against Standards and the Standard Indicators, particularly defined by each state, as previously described regarding the Indiana Standards. Standards Managers identify the minimum skill and knowledge base that should be taught to students, and Writing Portfolio Manager and Scrimmage Manager provide the tools to evaluate, track, and report on how well students meet benchmarks, as described above. With the Standards Managers modules, there are multiple standards for each subject, such as math, writing, science, social studies, etc. Standards can be tracked by course, by student, by teacher, by class, by school, by district, or by state. An Instance is the particular intersection of specific components, such as students, teachers, and courses, all of which comprise the Instance at a particular point in time. That is, multiple Instances could originate from the same teacher, the same course, but a different group of students, to yield multiple Instances of a specific class, wherein each Class has a unique ID. Each Instance has a unique ID to differentiate it from other variations with the same origin. For example, Mrs. Jones' Algebra class with Ann, Beth, and Carrie would yield a particular Class with its unique ID. Mrs. Jones' Algebra class with Paul, Quinn, and Raul, would yield another particular Class with its unique ID.

Scrimmage Manager offers a quick and advanced methodology for reporting such data as student progress. A Scrimmage is a type of formal quiz given to students, and each Scrimmage has its own ID. Each class has a unique ID and a Scrimmage Instance (here, the intersection of a particular class and a particular Scrimmage). Each student in each class has a unique ID and is graded for each Scrimmage in which he participates. All the demographics, class schedules, and teacher information are entered. As each teacher gathers new data (e.g., quiz grades for each student), the new data now get submitted directly into a normalized, central data store. The system of the present invention allows the teacher to quickly schedule and grade Scrimmages. A teacher can run reports on students, multiple classes, track progress or regression, and generate grades. Reports help identify questions that challenge students the most. The moment data are entered, the administrator can run reports looking for "at risk" students (i.e., an "At Risk Student Report"), decide where to put additional resources, and check to make sure goals are attained, instantaneously and in real-time. For example, the administrator can determine school, district, and state performance, a single student's performance across his classes, the performance of all a particular teacher's classes, school-wide performance trends, and trends by grade, level, gender, and ethnicity, as well as thousands of different combinations of those queries. The system takes cumulative information about students, teachers, classes, and entire schools and turns it into the establishment of trends, which can be viewed in real-time. Scrimmage Manager increases the scope of knowledge and reporting by putting all the schools' information into a single data store, as well as reporting on all the sub-levels, all the way down to an individual student.

Writing Portfolio Manager defines and tracks the required writing portfolios of students. This module can be used separately from the other Managers and AIM, as previously described, or plugged into the whole module system. Every document ever written by the student can be stored, regardless of file format, on the central server with the state-required scores, state Standards, and date for each document. Writing Portfolio Manager assists administrators and teachers in spotting potential problems, such as a trend of plagiarism, and gives them a chance to intervene as soon as problems begin to arise. Rather than focusing on the final results, administrators and teachers are able to focus on the performance and progress of each student at any time, in real-time. A particular group of students, a particular teacher, and a particular course form an Instance, which yields a class having a unique ID. Each student in each class has a unique ID. Each student has multiple Portfolio Entries, each with a unique ID, and each Portfolio Entry can have multiple scorings and multiple files, with descriptions attached, each with their own ID. The module manages the actual writing samples and scoring of those samples, as well as accomplishes aggregate reporting. Writing Portfolio Manager has a plurality of reports that give school administrations quick snapshots of demographics, writing portfolio progress, student and teacher strengths and weaknesses, as well as a variety of other queried data presented in intelligible formats. The Portfolio Entries, each having a unique ID, can be tracked by entry, by student, by teacher, by class, by school, by district, or by state.

The present inventive system has been written to manage actual writing portfolio samples and scoring of those samples and quizzes, as well as to aggregate reporting. The system has different levels of security to allow school administrators to limit who sees what within the system, and state of the art backup and security features that protect the data from being lost or improperly accessed. Standards Managers, Scrimmage Manager, and Writing Portfolio Manager can be accessed by a web browser making the system compatible with PCs, Macs, and Linux boxes. The system ensures compliance with each state's law, and provides the same scoring criteria as recommended by each state's education department.

For a better understanding of the present invention, together with other and further objects thereof, reference is made to the following description, taken in conjunction with the accompanying drawings, and its scope will be pointed out in the appending claims.

BRIEF DESCRIPTION OF THE DRAWINGS

The aspects and advantages of the present invention will be better understood when the detailed description of the preferred embodiment is taken in conjunction with the accompanying drawing, in which.

DETAILED DESCRIPTION OF THE PREFERRED EMBODIMENTS

While this invention is susceptible of embodiments in many different forms, there are shown in the Figures and will herein be described in detail, preferred embodiments of the invention with the understanding that the present disclosure is to be considered as an exemplification of the principles of the invention, and is not intended to limit the broad aspects of the invention to the embodiments illustrated.

Figure 1:
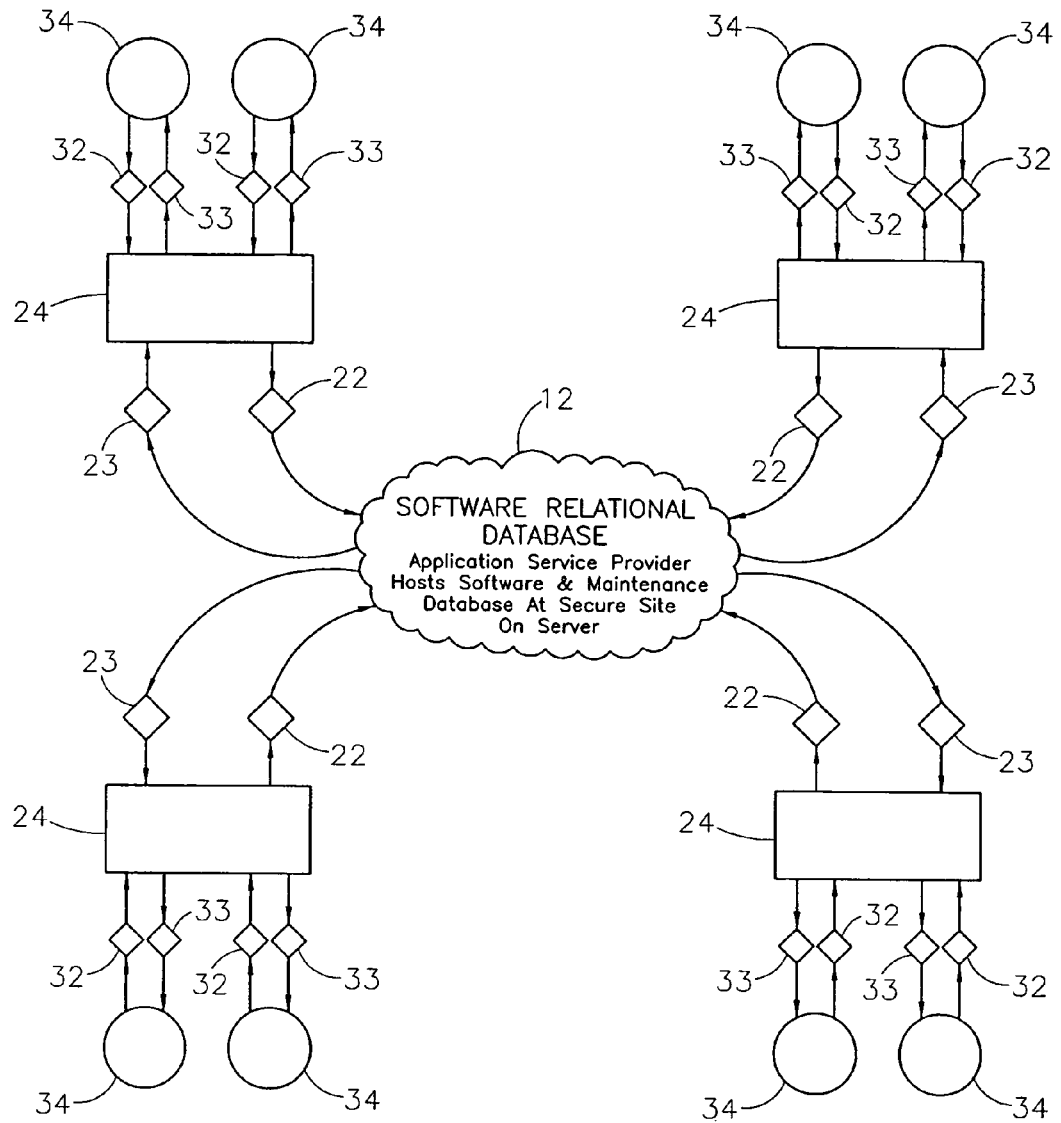
FIG. 1 is a diagram of the education administration system of the instant invention.

Referring to FIG. 1, the system is comprised of host computers (i.e., computers connected to the internet and located in classrooms, central offices of school districts, etc.) accessed by a plurality of teachers 34, a plurality of school administrations (or administrators) 24, and a central data store provided by a software relational database (i.e., a common database system) 12. The software relational database 12 is hosted and maintained by a secure application service provider (ASP). The software relational database 12 receives, collects, organizes, processes, maintains, and outputs data to school administrations 24 and teachers 34. The teachers 34 and school administrations 24 access the web-based software relational database 12 via user- and school-specific IDs (identification numbers) and passwords at their host computers, thereby eliminating the need for additional on-site hardware. School information 22 is imputed to the common software relational database 12 by school administrations 24. This information 22 includes, but is not limited to, teacher biographies, class rosters, and school curriculum. School administrations 24, in turn, each receive information 32 from a plurality of teachers 34 in each school administration 24. This information 32 includes, but is not limited to, assignments, grades (i.e., quiz grades), attendance, achievement awards, and portfolio entries.

The software relational database 12 communicates with teachers 34 and school administrations 24 via the internet. As soon as information is entered into the software relational database 12, teachers 34 and administrators 24 can make pinpoint assessments, in real-time, of which students are being challenged by what questions. Test results are recorded such that they can be summarized by student, course, and teacher.

Lookup codes save data-entry time and help ensure the accuracy of information 22, 32 entered into the system. A set of lookup codes is used to populate dropdown lists. When dropdown arrows for a file are selected and a list of options appears, the options are set up as lookup codes. These lookup codes enable schools to customize the kind of information they track about their students. Changes to lookup codes affect the options presented to users when they click on dropdown lists.

Figure 2:
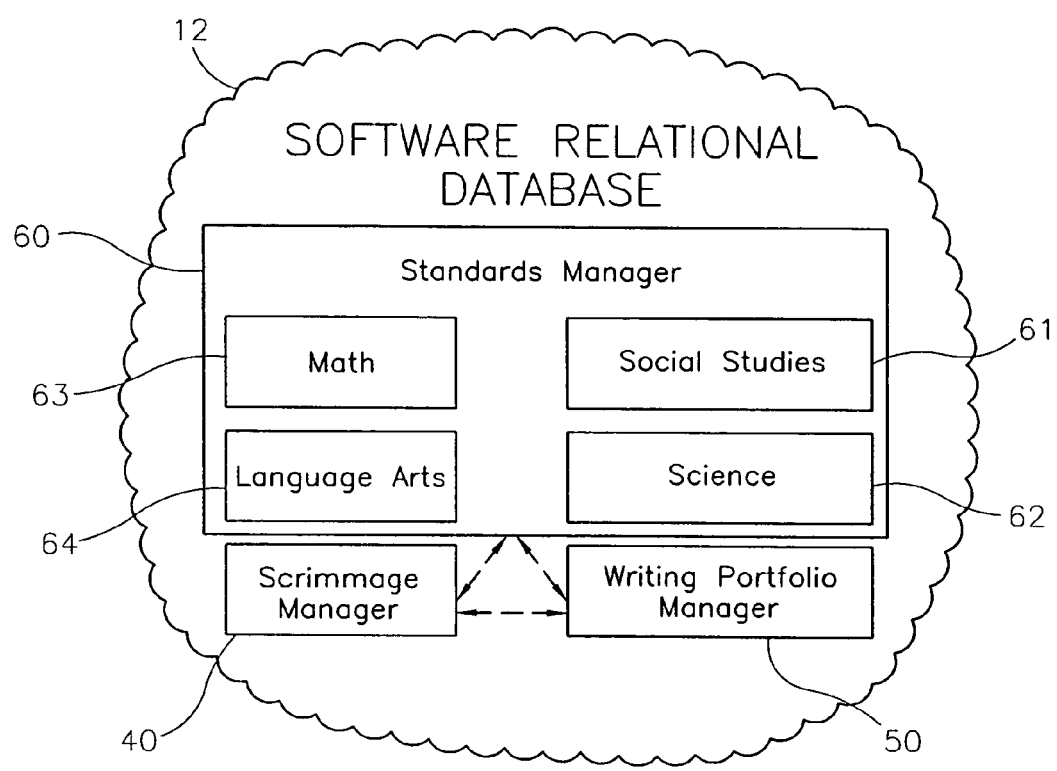
FIG. 2 is a diagram of the system's software relational database of the present invention.

As illustrated by FIG. 2, the software relational database 12 supports a plurality of subsystems, the first subsystem being Standards Managers 60, the second subsystem being Scrimmage Manager 40, and the third subsystem being Writing Portfolio Manager 50, each of which can work separately or together, and are discussed individually in further detail below. FIGS. 3-5d illustrate elements all the Managers have in common. In all the Managers, each State has a unique ID 71; each District within each State has a unique ID 72; each School within each District has a unique ID 73; each Student within each School has a unique ID 76; each Teacher within each School has a unique ID 75; and each Course within each School has a unique ID 74. Additionally, in all Managers, particular Students, Teachers, and Courses—although abstract entities individually—come together to form a specific Instance 100. For example, the intersection of Students 76, a Teacher 75, and a Course 74 results in a specific Instance 100 (such as Ms. Smith's Chemistry Class with Alex, Betty, and Clay), which yields a Class having a unique ID 77. Each Student within each Class 77 has a unique ID 78. The Student IDs 78 for a Class 77 are a subset of all Student IDs 76 which exist for the total population of students at a school. The same student has the same Student ID in both Student ID 76 (as part of the overall student population) and Student ID 78 (as part of a specific Class 77). Due to the unique IDs assigned to each component, it is possible to produce almost any desired report, instantaneously and in real-time, on which data are gathered, including cross-application query reports.

Standards Managers

Standards Managers 60 link the Scrimmage Manager 40 and the Writing Portfolio Manager 50 and are illustrated in more detail in FIGS. 5a-5d. Within each Class 77 is a subset of Students 78. Each Course in each subject area has a unique Course ID 74. The subject areas are illustrated in FIGS. 5a-5d for example only, and may include—but are not limited to—Language Arts 64, Science 62, Math 63, and Social Studies 61. Language Arts 64 includes reading and writing. Each course in each of the subject areas is comprised of Critical Vocabulary with unique IDs 91 and Learning Objectives with unique IDs 92. Each subject area will have unique Standards IDs, and is illustrated as Language Arts Standards IDs 93, Science Standards IDs 94, Math Standards IDs 96, and Social Studies Standards IDs 95. The system tracks against all Standards—Federal, State, and Local—with the State being the key Standard. Standards can be tracked by Standard, by subject, by student, by teacher, by course, by class, by school, by district, or by state.

Each Standard 93, 94, 96, 95 contains a plurality of Standard Indicators, each of which has unique Standard Indicator IDs 87. The same Critical Vocabulary 91, Learning Objectives 92, Standards 93, 94, 96, 95, and Standard Indicators 87 for a particular Course 74 are taught by following a series of Unit Plans, each having unique IDs 89 for each Class 77. Critical Vocabulary 91 is the base of words or phrases which is necessary to understand the Standards 93, 94, 96, 95 and Standard Indicators 87 being taught. For example, students who are being taught a Standards Indicator about adding fractions will need the Critical Vocabulary 91 of "numerator," "denominator," "lowest common denominator," etc. Without understanding these terms, the students will not be able to grasp the Standard Indicators about adding fractions. Learning Objectives 92 are tasks or concepts defined by the Standard Indicators 87. For example, for the Standard Indicator "Add and subtract decimals," a Learning Objective could be to determine the correct change that should be given from a purchase at a store. Furthermore, Unit Plans 89 are groups of lesson plans that cover a particular set of concepts, and generally cover a certain number of teaching days in length. Unit Plans 89 are often based on chapter divisions of the primary textbook being used for a particular subject, such as a Unit Plan in history could be on "U.S. Civil War and Reconstruction." The material covered by the totality of the Unit Plans 89 should comprise all the Standards 93, 94, 96, 95, and Standard Indicators 87 for a particular class at a particular grade level.

To assist teachers 34 in determining student progress, Standards Managers identify for teachers 34 and administrators 24 what Standards must be covered in the content of a given class at a given grade level for the period of the school year. Under the Standard for each subject area, Standard Indicators 87 detail the more specific task competencies (i.e., benchmarks) which comprise the Standard. To assist teachers 34 in differentiating among the Standard Indicators 87, the system of the present invention provides a specific example of each.

To assist teachers 34 in developing their Unit Plans 89 for a particular course, Standards Managers identify all relevant Standards 93, 94, 96, 95 and Standard Indicators 87, as well as Critical Vocabulary 91 needed by the students to understand each Standard 93, 94, 96, 95 and Standard Indicator 87. The system assures that teachers 34 do not inadvertently omit any Standard 93, 94, 96, 95, Standards Indicator 87, Critical Vocabulary 91, or Learning Objective 92 from the series of Unit Plans 89 comprising the course. Once the Unit Plans 89 for a course are created, teachers 34 can save them as templates. The templates allow Unit Plans 89 for a course to be used during multiple class periods or reused as the basis for Unit Plans 89 in a subsequent school year. The templates can also be shared with other teachers, within the same school or even teachers across the country, allowing others to model their Unit Plans 89 on ones that have already been created. The potential time savings is considerable.

Administrators 24 have access to Unit Plans 89 created by teachers 34 in Standards Managers 60. Based on student results, administrators 24 may encourage sharing of templates of specific Unit Plans 89 whose use has resulted in positive student outcomes. Since the system allows information to be shared at the school, district, and state levels, sharing of successful Unit Plans 89 can facilitate organizational learning and save time. Administrators 24 and teachers 34 can also both confirm that all Standards 93, 94, 96, 95 and Standard Indicators 87 have been covered in a class, and when they were covered.

Scrimmage Manager

Figure 4:
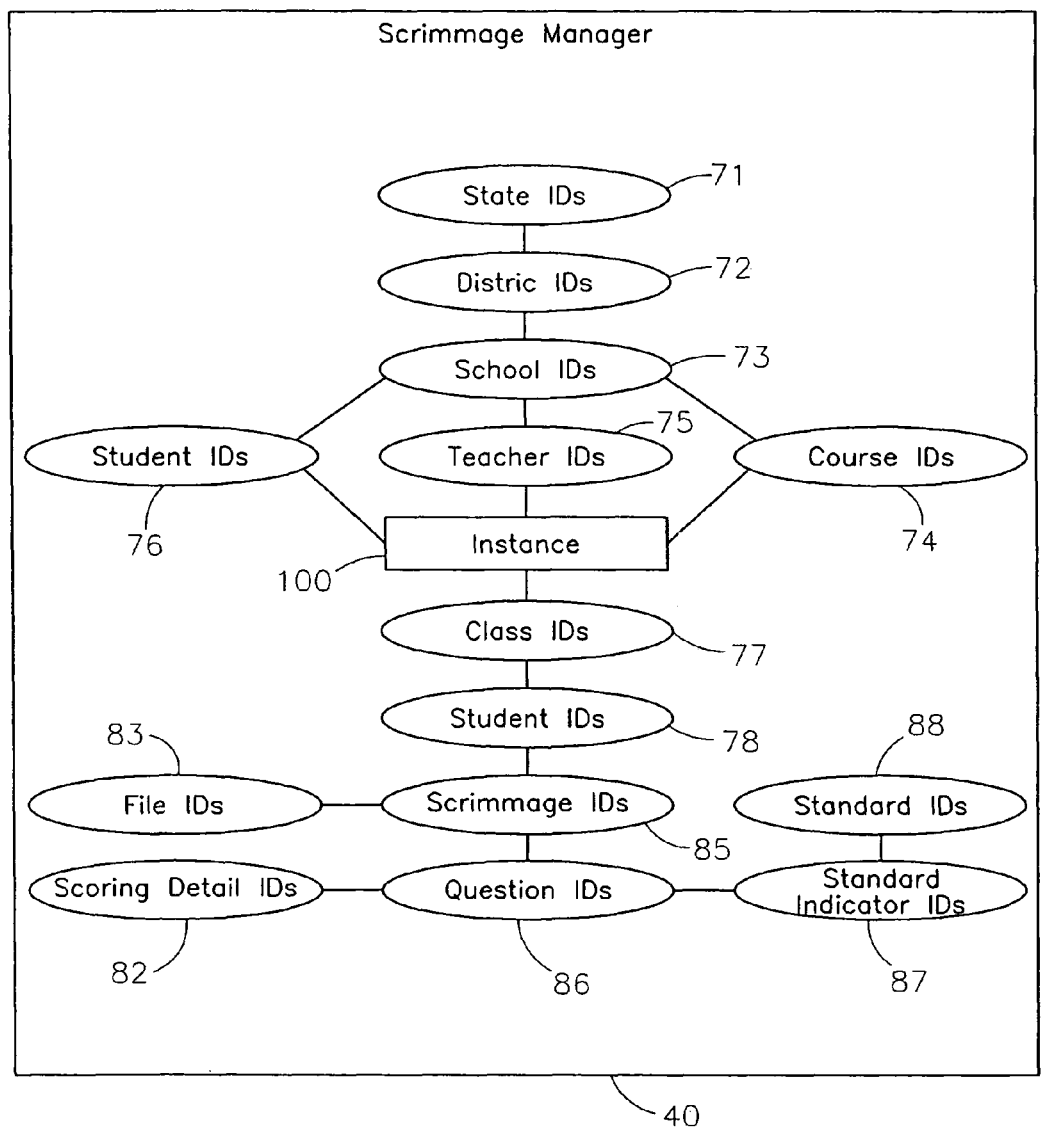
FIG. 4 is a diagram of the Scrimmage Manager module of the present invention.
Figure 5A:
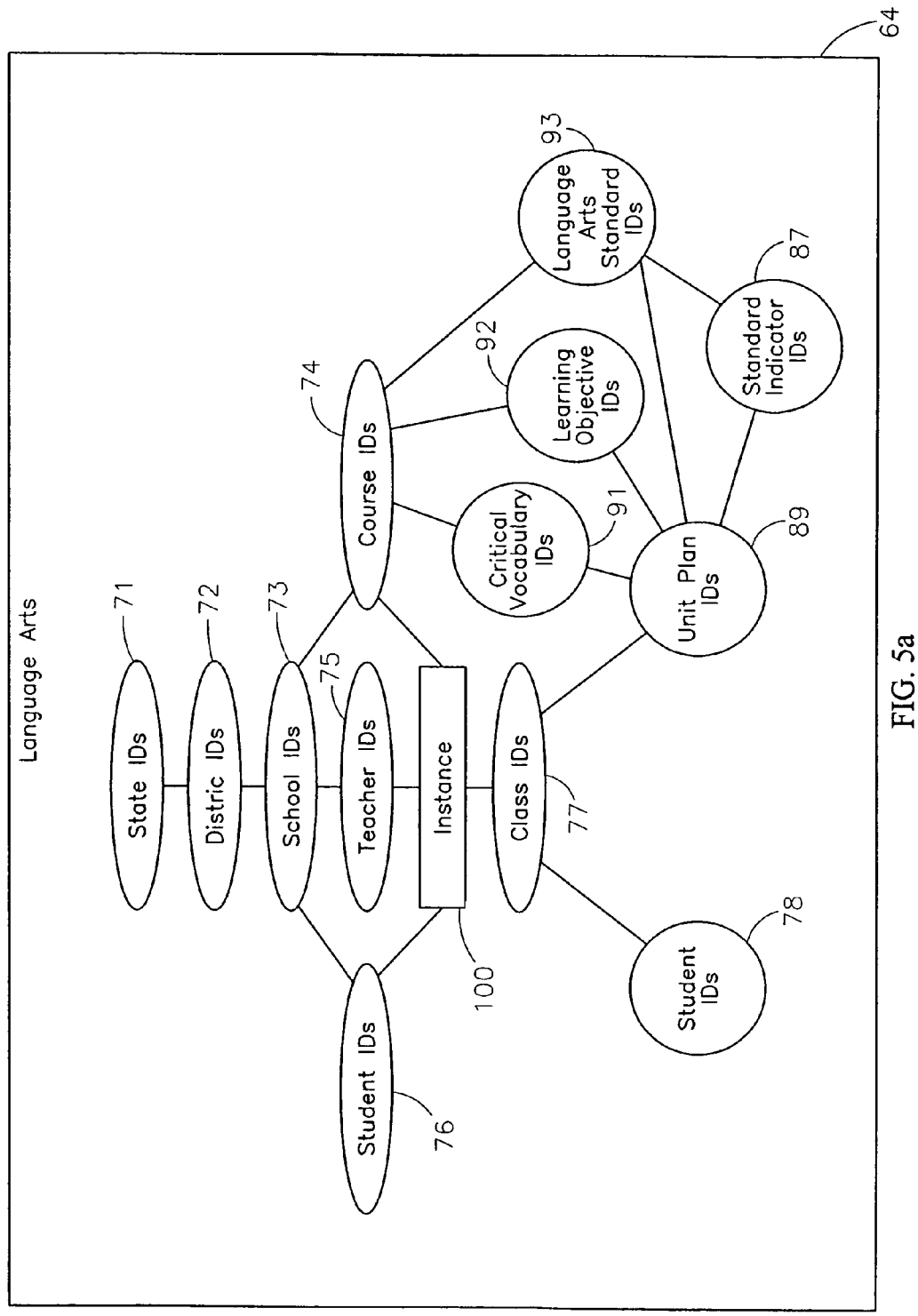
FIG. 5a is a diagram of the Standards Manager module of the present invention depicting Language Arts.
Figure 5B:
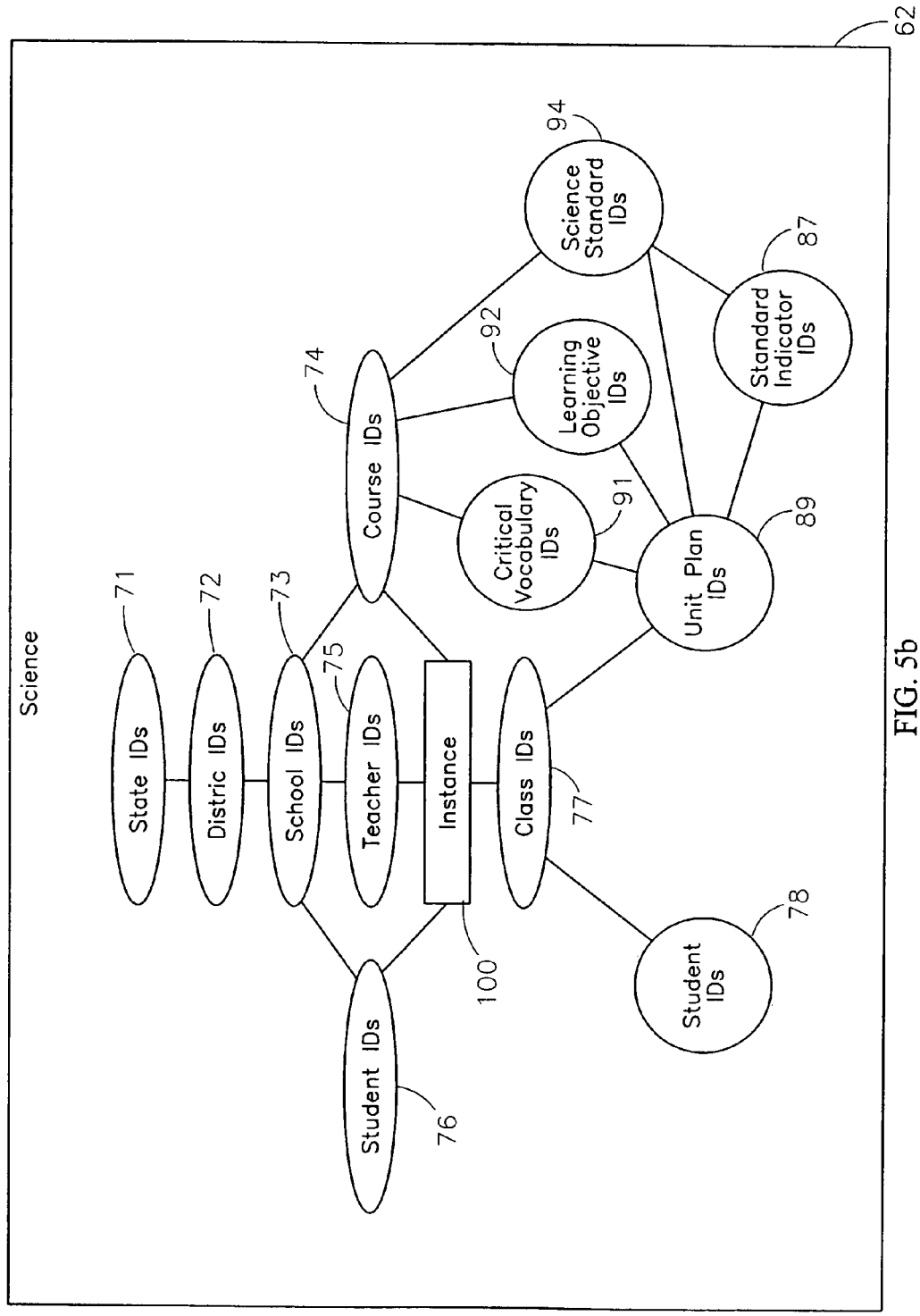
FIG. 5b is a diagram of the Standards Manager module of the present invention depicting Science.
Figure 5C:
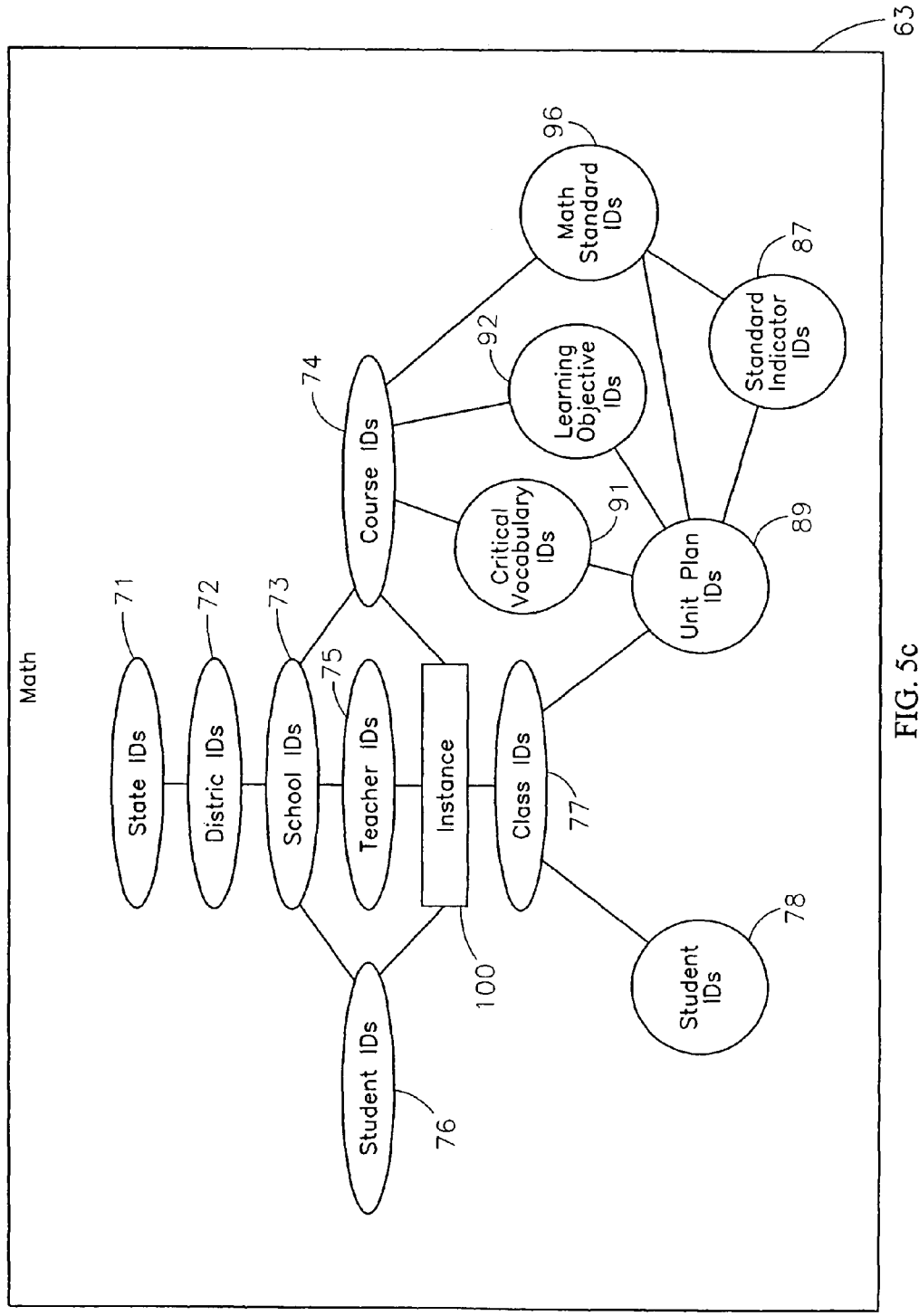
FIG. 5c is a diagram of the Standards Manager module of the present invention depicting Math.
Figure 5D:
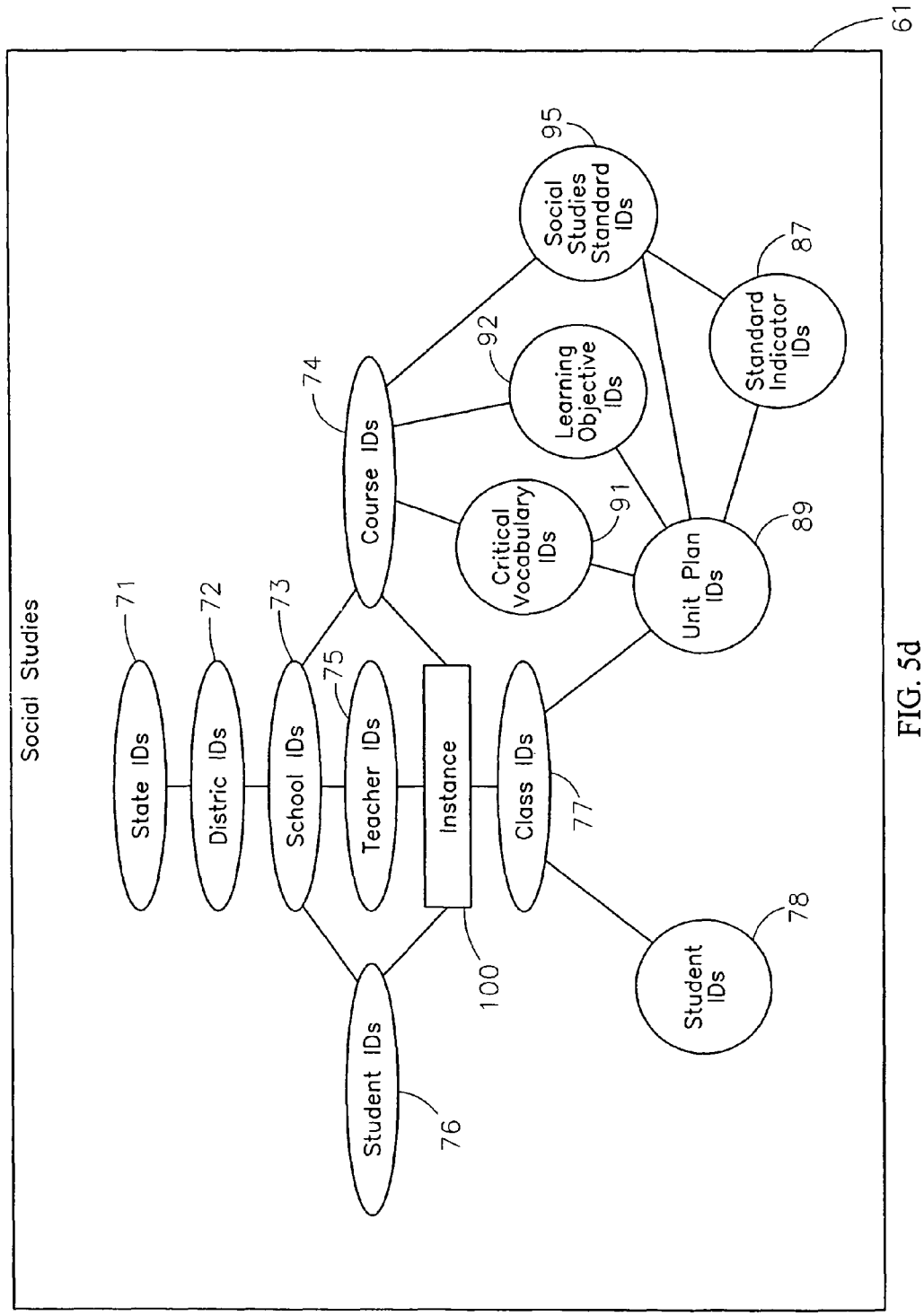
FIG. 5d is a diagram of the Standards Manager module of the present invention depicting Social Studies.

Referring now to FIG. 4, the Scrimmage Manager 40 component of the present invention tracks results of all Scrimmages (i.e., quizzes and tests) entered, and can generate reports summarizing those results by class, by student, by teacher, by question, etc. Notably, reports can be generated in just about any way an educator would need in order to identify problem areas, as well as areas that have been taught successfully, via the use of the unique IDs. Within each Class 77 is a subset of Students, each having unique IDs 78. Each student participates in Scrimmages, each having unique IDs 85. An Instance of a Scrimmage given on a particular date has a unique File ID 83. Each Scrimmage has a plurality of Questions, each of which has a unique ID 86. The Questions contain Scoring Detail, each having unique IDs 82. The Standards 88 (each having a unique ID) and Standard Indicators 87 (each having a unique ID) link Scrimmage Manager 40 to the Standards Managers 60, which define the particular Standards 88 that must be attained by way of Standard Indicators 87 for each subject area.

The operation of the system can be described in connection with the block diagram shown in FIG. 1. The school administration 24 defines and enters the quiz templates it wants to allow teachers 34 to use when they schedule scrimmages. Each class has a Scrimmage Instance 100, and each student is graded for the Scrimmage. All the demographics, class schedules, and teacher information are entered and submitted into the software relational database 12 beforehand. As teachers 34 gather new data (i.e., scrimmage results), the new information 32 now gets submitted directly by the teachers 34 to the school administration 24, which aggregates all the information 32 and directly submits the aggregated information 22 to the centralized software relational database 12. The system allows teachers 34 to quickly schedule and enter Scrimmage results into the central data store, provided by the software relational database 12, as previously explained. Teachers 34 choose and schedule one or multiple Instances of a Scrimmage on specific dates in the system. After scrimmages are conducted and graded, the results are entered, via information entry 32 and information entry 22, into the Scrimmage Manager database provided by the software relational database 12. Reports analyzing scrimmage results are available immediately (i.e., in real-time). School administrations 24 and teachers 34 can access the analyzed reports. The software relational database 12 outputs information 23 to the school administrations 24 which can view the reports, and further output of information 33 can be accessed by teachers 34.

At the time of system installation in each school administration 24, which would also include installation for teachers 34 in the school administration 24, the school administrations 24 can communicate through their computer with the teachers' 34 computers for receiving information 32 from and outputting information 33 into the teachers' 34 computers. School administration 24 information 33 output to teachers 34 includes a cross section of student performance, such as the Scrimmage Reports (i.e., quiz results) and whether certain Standards 88 have been attained, as previously discussed. Teachers 34 may group and summarize Scrimmage results by which students missed particular questions, and receive an analysis by Standard Indicator 87. A Missed Questions report allows teachers to pinpoint questions that caused problems at the time of the Scrimmage. For each question, the Missed Questions report identifies the number of correct responses, non-responses, incorrect responses, and the most common incorrect responses. A teacher 34 can run reports on students, multiple classes; track progress or regression at both the class and individual student level, and generate grades. Built-in reports help identify questions that challenge students the most.

The moment information 32 is entered, the administrator 24 can run reports looking for "at risk" students, decide where to put additional resources, and check to make sure goals and Standard Indicators 87 are attained, for example. The administrator 24 can look up school, district, and state performance, a single student's performance across his classes, the performance of all a particular teacher's classes, school-wide performance trends, and trends by grade, level, extracurricular participation, gender, and ethnicity, as well as thousands of different combinations of those queries. The system takes cumulative information about students, teachers, classes, and the entire school(s) and turns it into the establishment of trends. Scrimmage Manager 40 increases the scope of knowledge and reporting by maintaining all the schools' information, submitted via 22 and 32, in a single data store, the software relational database 12, and processes and outputs information 23 and 33 on all the sub-levels, all the way down to an individual student.

Writing Portfolio Manager

Figure 3:
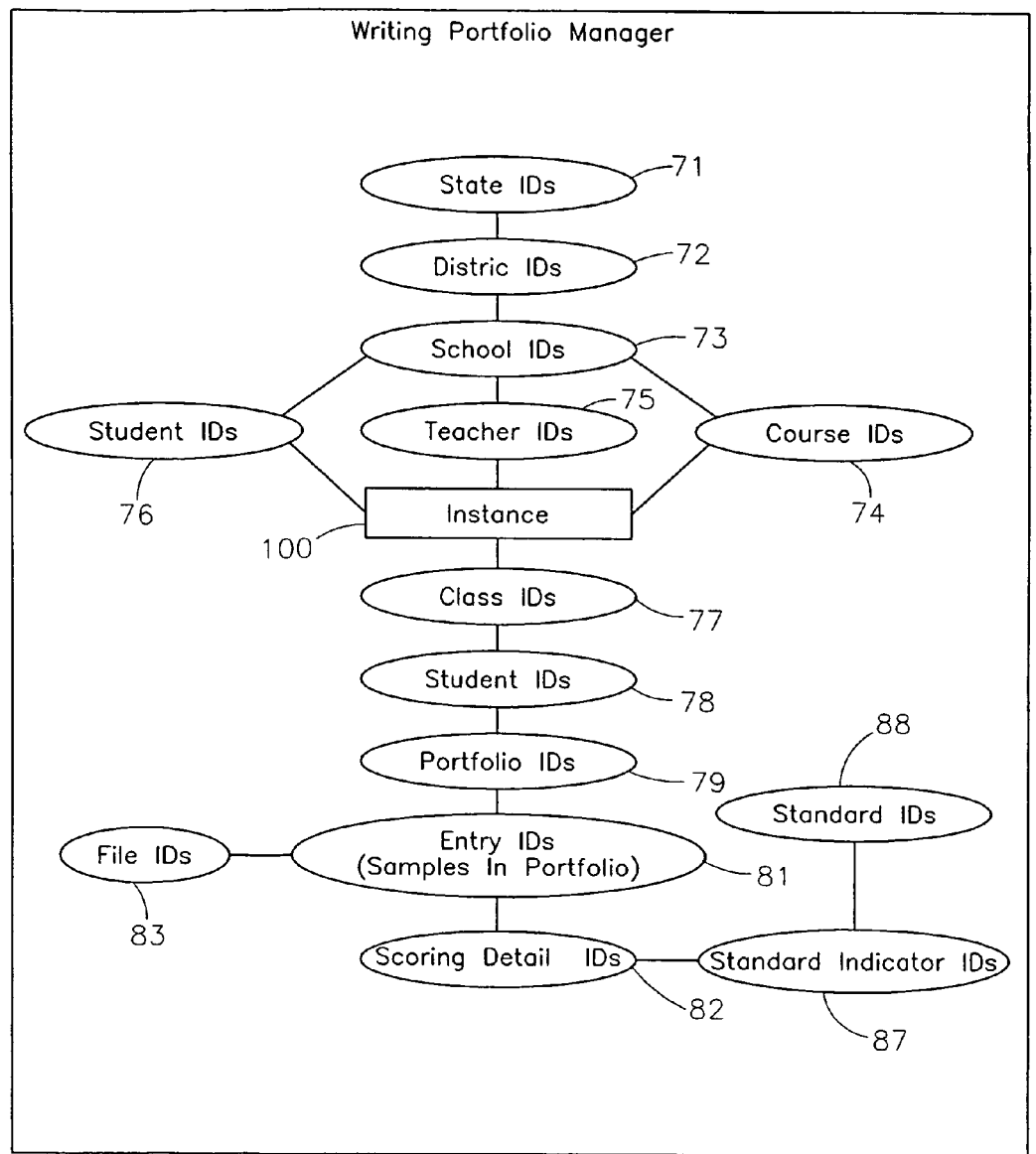
FIG. 3 is a diagram of the Writing Portfolio Manager module of the present invention.

Referring now to FIG. 3, Writing Portfolio Manager 50 defines and tracks the results of all writings that the teachers 34 and school administrations 24 enter into the software relational database 12. Every document ever written by the student can be stored, regardless of file format, on the software relational database 12 with the state-required scores, state Standards and Standard Indicators (as defined by the Standards Managers 60 and previously discussed), and date for each document. Writing Portfolio Manager 50 generates reports summarizing scores, based on the Standards, by student, by class, by teacher, by writing type, etc., in order to identify problem areas. Rather than focusing on the final results, school administrations 24 and teachers 34 are able to focus on the progress of each student. Within each Class, each Student has a unique ID 77. Each Student has Portfolios, each Portfolio having unique IDs 79. The Portfolio is comprised of Entries, each having unique IDs 81. Each Entry is comprised of a number of Scoring Details, each having unique IDs 82. These Scoring Detail IDs 82 contain information such as, for example, document type, abstract, reviewer's name, presence of plagiarism, and a detailed list of areas for improvement such as ideas, organization, and style. Also, each Entry may contain many version of the File, each having unique IDs 83, and may be of any type, such as Microsoft Word documents or scanned "JPEG" image files. Neither the possible types of files nor the number of files stored in a Portfolio Entry is limited. The Standards 88 and Standard Indicators 87 link Writing Portfolio Manager 50 to the Standards Managers 60, which define the particular Standards that must be met by way of Standard Indicators 87 for each subject area.

The Writing Portfolio Manager 50 manages the actual writing samples and scoring of those samples, as well as accomplishes aggregate reporting. Each student has an Overall Score, which allows teachers 34 to record high-level assessments in the student's portfolio and view student performance. Teachers 34 and school administrations 24 access a database screen for submission of information 32 and 22, respectively, to the Writing Portfolio Manager 50 in the central data store, provided by the software relational database 12. The Writing Portfolio Manager 50 provides schools and teachers with the opportunity to record specific information, such as Document Type, Writing Category, Date, Title, Abstract, Plagiarism, the reviewer's name, etc., for every portfolio entry ever submitted by every student. Teachers 34 may record and submit informational details 32 such as overall strong and weak points, content area, and whether the portfolio entry is a revision of one submitted earlier by the student. The system also allows teachers 34 the ability to evaluate each portfolio's specific areas of weakness, recording very specific details on shortcomings in areas of ideas and content, organization, style, language conventions, and learning and performing behaviors. The system, at the software relational database 12 level, provides school administrations 24 and teachers 34 with the information, 23 and 33, respectively, and tools they need to analyze the portfolio entries and generate reports that identify students who need intervention. For example, when a teacher 34 enters an evaluation of an "at risk" student, that student will show up on an At Risk Student Report. This At Risk Student Report identifies basic student and school data, and can easily be customized to show specific demographic data of the teacher's choosing. Also, the Student Portfolio Performance Report provides a snapshot of student performance.

Standards Managers, Scrimmage Manager, and Writing Portfolio Manager

Figure 6:
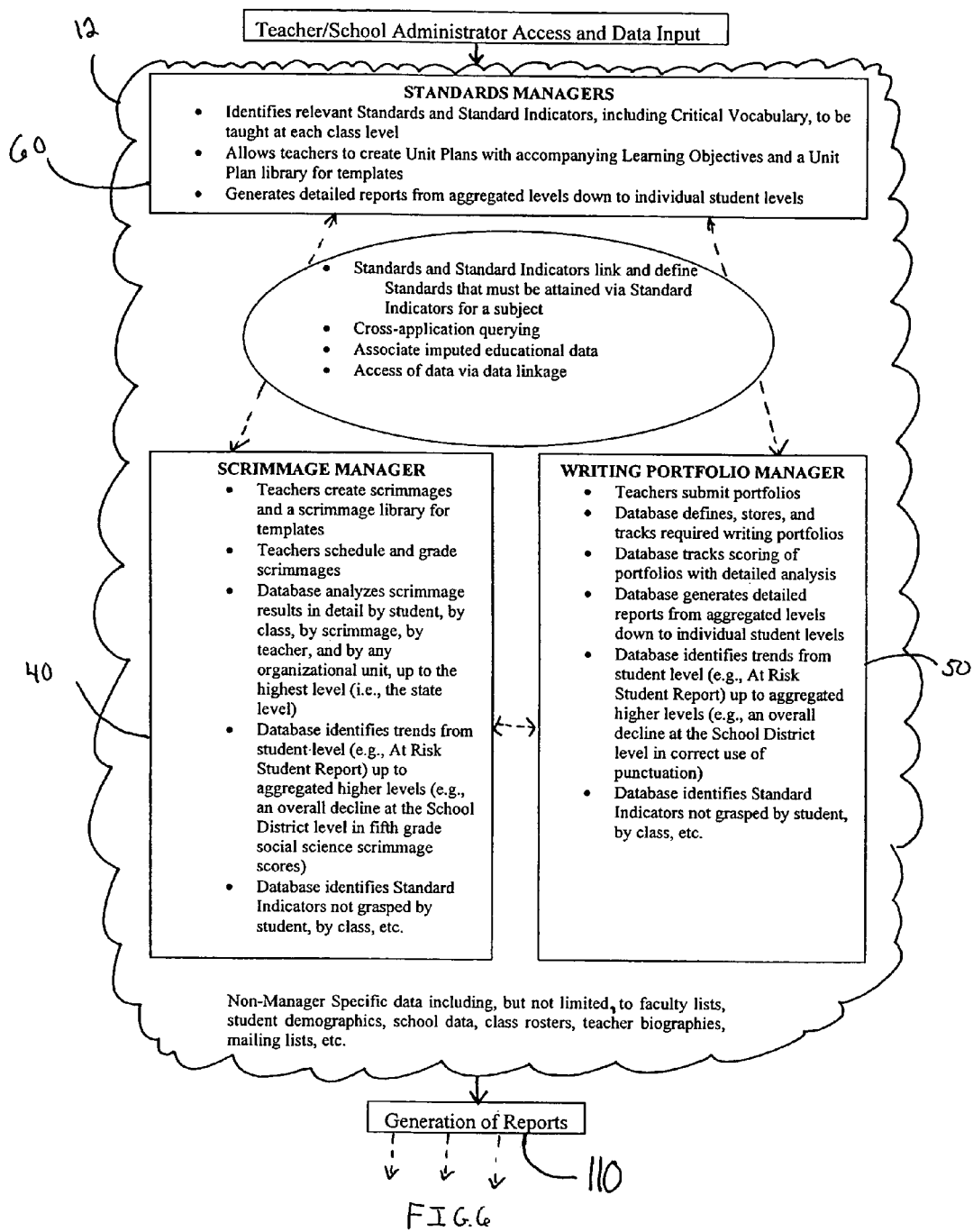
FIG. 6 is a diagram of the input of data into the system's software relational database and the generation of reports.
Figure 6A:
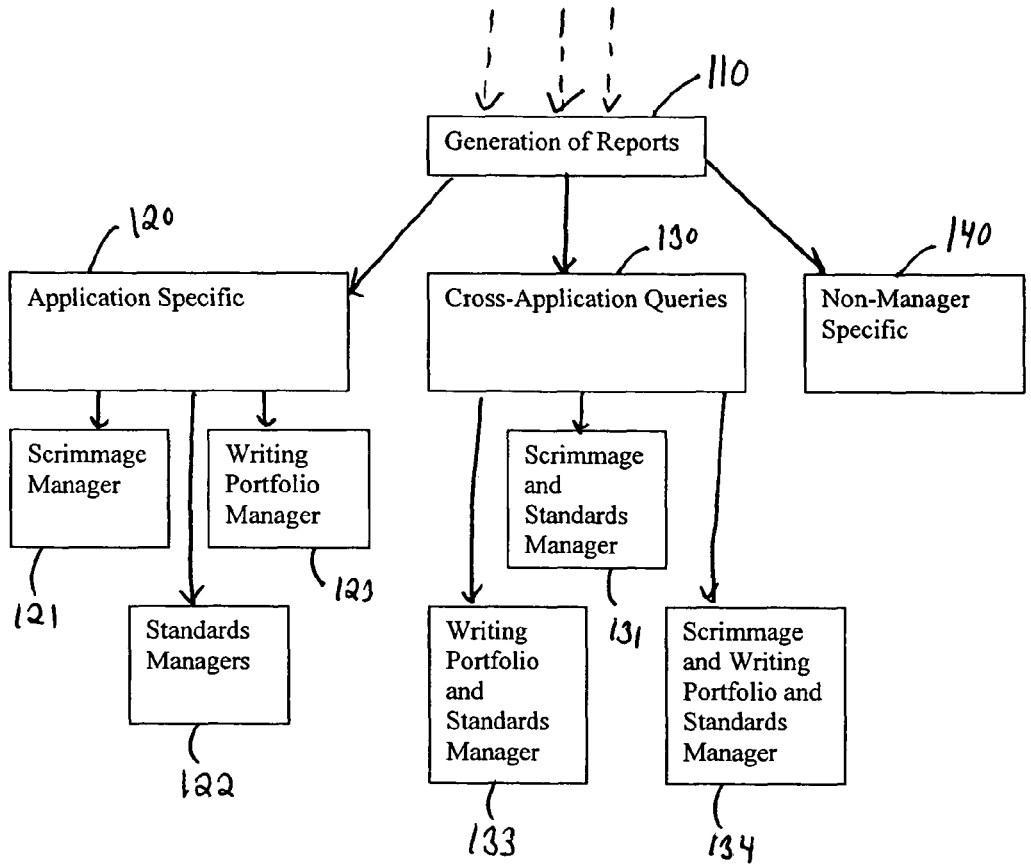
FIG. 6a is a continuation of the diagram of FIG. 6 of the input of data into the system's software relational database and the generation of reports.

Referring now to FIGS. 6 and 6a, the unique IDs assigned to each component of the system of the present invention facilitate the linking of each of the Managers, if desired, and the generation of nearly any desired Report 110, instantaneously and in real time, on which data within the system are gathered, including Application-Specific Reports 120, Cross-Application Query Reports 130, and Non-Manager Specific Reports 140. FIGS. 6 and 6a illustrate in more detail the interrelationships of the Standards Managers 60, the Scrimmage Manager 40, and the Writing Portfolio Manager 50 within the software relational database 12, and the generation of Reports 110. The Non-Manager Specific Report 140 generates Reports including data regarding student demographics, class rosters, teacher biographies, etc. Application-Specific Reports 120 include Scrimmage Manager Reports 121, Standards Managers Reports 122, and Writing Portfolio Manager Reports 123. These Reports 121, 122, 123 are generated independent of each other. For example, if a school administrator wants to see the performance of a particular teacher's classes on a quiz, Scrimmage Manager Reports are generated. Cross-Application Query Reports include Scrimmage and Standards Managers Reports 131, Writing Portfolio and Standards Managers Reports 133, and Scrimmage and Writing Portfolio and Standards Managers Reports 134. These Reports 131, 133, 134 can be generated due to the data linkage of the unique IDs in the system. For example, the Standard IDs 93, 94, 96, 95 for a given subject and the associated Standard Indicator IDs 87 link the Standards Manager 60 with the Writing Portfolio Manager 50 and identify and define what Standards must be achieved for a particular writing portfolio entry. Additionally, the Report 133 would identify what Standard Indicators 87 were not grasped by a student, by a class, etc., for that writing portfolio entry.

Figure 7:
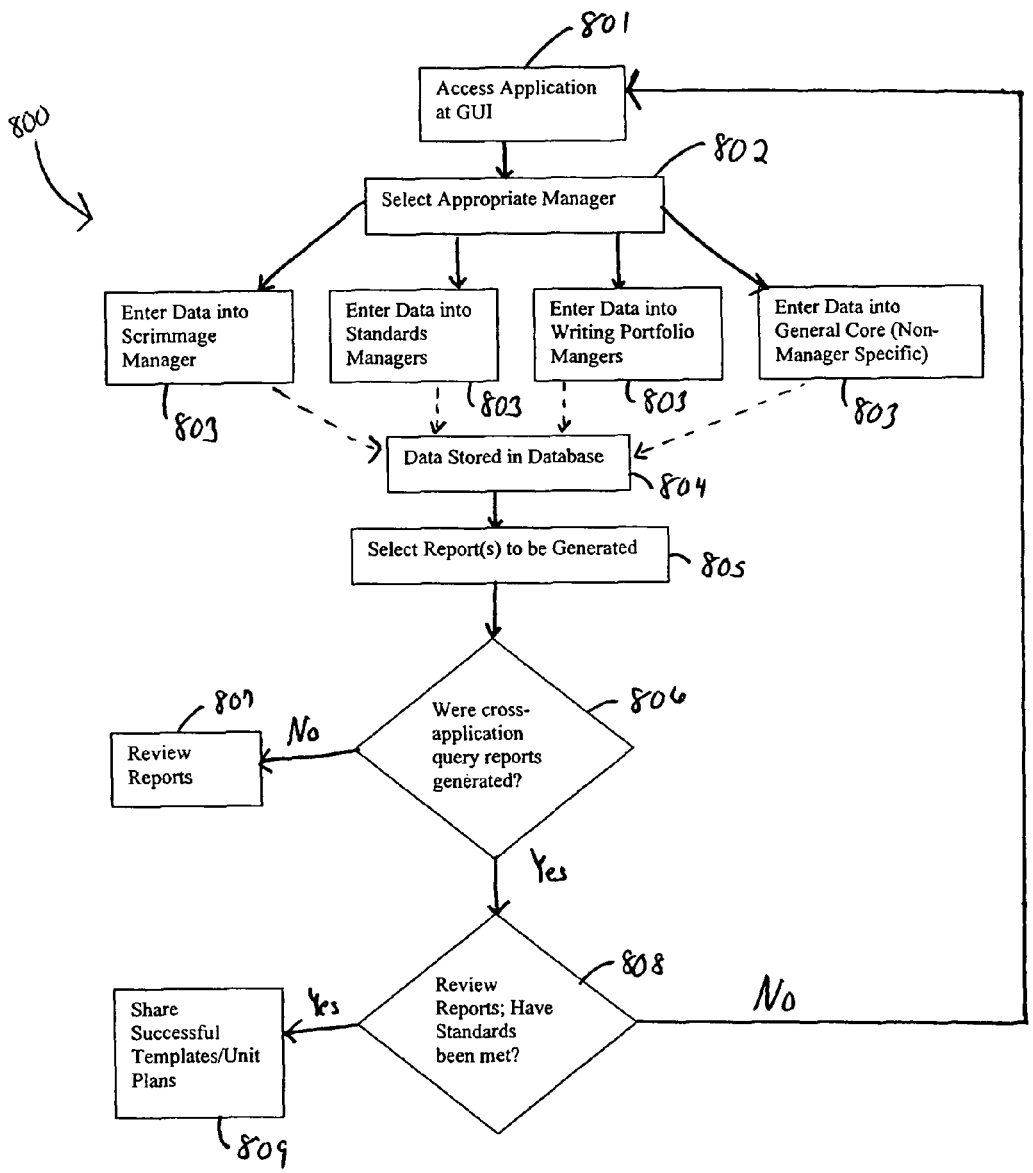
FIG. 7 is a flow chart showing the process steps of accessing the system's software relational database and generating reports from the system's software relational database.

FIG. 7 is a flow chart showing a process 800 of entering the data into the software relational database 12, the aggregation of data within the database 12, and the generation of Reports 110 from the database 12, as desired by a plurality of users (i.e., teachers and school administrators). Teachers or school administrators access 801 the application at the graphical user interface. The teachers or school administrators select 802 the appropriate Manager according to the type of data to be entered. For example, if the data includes faculty lists, student demographics, general school data, etc., the Non-Manager-Specific core (i.e., general database) of the software relational database 12 should be selected. Also, for example, if the data include information regarding Standards, or a teacher wants to access the Unit Plans 89, Standards Managers 60 are selected, depending on the subject area. If the data includes information regarding the scheduling, creation, or grading of scrimmages, Scrimmage Manager 40 is selected. Furthermore, for example, if the data includes information regarding the submission of portfolios and the specific details accompanying each portfolio entry, Writing Portfolio Manager 50 is selected.

After the teachers or school administrators selects 802 the application (i.e., Manager), information relative to that particular Manager, as described above, is entered 803 into the appropriate Manager. For example, if a teacher chooses to enter quiz grade results, the teacher would select the Scrimmage Manager and then enter the quiz grade results into Scrimmage Manager. As another example, if a teacher chooses to submit a portfolio entry and whether the student plagiarized on the portfolio, the teacher would enter the relevant information into the Writing Portfolio Manager. The information is stored, organized, tracked, and aggregated 804 within the software relational database 12 and within the appropriate Manager, if selected 802.

Next, a plurality of users selects 805 the Reports 110 from a list of available reports desired to be generated from the software relational database 12. Referring back again to FIG. 6, these Reports 110 can be Application Specific Reports 120; Cross-Application Query Reports 130; or Non-Manager Specific Reports 140. Within each of these categories, a plurality of Reports 110 can be generated, depending on the set of parameters selected 805 by the users. The following illustrates examples of the many types of Reports 110, as shown in FIG. 6, which can be generated, and should not be considered unduly limitative of the invention.

The teacher or school administrators can select Scrimmage Manager Reports 121, an Application Specific Report 120. This selection allows users to identify and review student, school, district, and state performance and performance trends on quizzes; review performance of a particular teacher's classes compared with another teacher's classes in the same school, district, or state; track the progress of a student or class; generate quiz grades; and review scrimmage results in detail by student, by class, by scrimmage, by teacher, and by any organizational unit.

The teacher or school administrator can select Standards Managers Reports 122, another Application Specific Report 120, to identify relevant Standards and Standards Indicators 87, including Critical Vocabulary 91, to be taught at a particular class level. Users can access Unit Plans 89 created by other users, accompanied by Learning Objectives 92 and Critical Vocabulary 91. The Standards Managers Report 122 advises teachers what Standards must be achieved for each subject area, what Standard Indicators 87 must be attained in order to achieve those state-defined Standards, and when the Standards were attained.

The teacher or school administrator can select Writing Portfolio Manager Reports 123, the final Application Specific Report 120, which allows users to identify and review student, school, district, and state performance and performance trends on Portfolio Entries 81; review performance of a particular teacher's classes compared with another teacher's classes; track the progress of a student or class regarding Portfolio improvement; generate an Overall Score; and review Portfolios with detailed analysis, which includes Scoring Details 82, document type, abstract, reviewer's name, presence of plagiarism, overall content area, strong and weak points, and whether the entry is a revision.

The teacher or school administrator can choose to perform a cross-application query of Scrimmage Manager and Standards Managers Reports 131, a Cross-Application Query Report 130. For example, when Standards Managers are used in conjunction with Scrimmage Manager, analysis of the most common incorrect response identified in the Missed Question Report of Scrimmage Manager can help teachers 34 identify what Standards and Standard Indicators—relayed from the Standard IDs 93, 94, 96, 95 and the Standard Indicator IDs 87 for a particular subject of the Standards Managers 60—were not grasped by the students in a given class or course. Consequently, the Unit Plan 89 can be revised to provide more emphasis on those weaker subject areas, resulting in more effective teaching the next time a particular Unit Plan 89 is taught. Also, Scrimmage Manager 40 would enable a school to break out quiz results for a given course by a teacher, perhaps to see if one teacher's approach led to better results than another teacher's approach. Again, this information can be shared with other teachers 34 throughout the school, school district, state, and even on a national level. For example, if students met the Standards via successful performance on a quiz in a given subject area, the teacher may choose to place his Unit Plan 89 used for teaching the subject area in the database 12 for access by other users. On the other hand, if a particular teacher's class performed poorly on a quiz in a given subject area, the teacher may choose to access another teacher's Unit Plan 89 that proved to be more successful, which would be determined by the successful performance of students on a quiz.

The teacher or school administrator can choose to perform a cross-application query of Standards Managers and Writing Portfolio Manager Reports 133, another Cross-Application Query Report 130. For example, Writing Portfolio Manager 50 allows a School District to compare the number of Portfolio Entries of each fourth grade Language Arts class throughout the District, and this cross-application query report would identify what Standards and Indicators—relayed from the Standard IDs 93, 94, 96, 95 and the Standard Indicator IDs 87 for a particular subject of the Standards Managers 60—were not grasped by the students. The District can see if significant variations exist, by school, in the number of portfolio entries per student for the same classes, and track student performance and progress based on the Standards and Standard Indicators 87 by student, class, teacher, writing type, etc.

The teacher or school administrator can choose to perform a cross-application query of Scrimmage Manager, Writing Portfolio Manager, and Standards Managers Reports 134, yet another Cross-Application Query Report 130. The cross-application query capabilities of the system allow a teacher to check to see how a student is performing and progressing in other classes, and to determine whether a student has met the state-define Standards for subject areas in scrimmages and writing portfolios. These are just a few of the multitude of cross-query reports that can be generated due to the data linkage via unique IDs of the system.

After the Reports 110 selected by the users have been generated, the next step depends upon whether a cross-application query report 130 had been generated 806. If not, the Report can be reviewed by the user and analyzed depending on the parameters selected by the user 807. For example, a teacher may wish to view the performance trends of a particular student by accessing the Scrimmage Manager to determine whether the student's quiz grades were improving in all of his classes. If a cross-application query report 130 is generated, the user can review the Report to determine whether state-defined Standards have been achieved by meeting Standard Indicators 87 in particular subjects on quizzes and writing portfolios, depending on the parameters selected by the user 808. Once certain Standards have been achieved then the users can save the successful Unit Plan used to instruct students for reference by other users 809, and move onto the next Standard to be met. If Standards have not been achieved, as indicated by scrimmage and writing portfolio results, then the user can re-access the application 801 and perhaps utilizing a Unit Plan submitted by another user that has proved to be successful to instruct students on the Standard to be met before again scheduling a quiz or assigning additional writing portfolios.

The foregoing detailed description is given primarily for clearness of understanding and no unnecessary limitations are to be understood therefrom, for modifications will become obvious to those skilled in the art upon reading this disclosure, and may be made without departing from the spirit of the invention and scope of the appended claims.

What is claimed is:

1. An education system for assessing performance in a variety of areas of education, comprising:

one or more individual systems, wherein said one or more individual systems are software components implemented within a computer server, said individual systems including a Scrimmage Manager, a Writing Portfolio Manager, and a plurality of Standards Managers, wherein said Scrimmage Manager, said Writing Portfolio Manager, and each of said Standards Managers each have a plurality of Standards and a plurality of Standard Indicators, each of said Standards and each of said Standard Indicators having a unique ID to link said Scrimmage Manager with said Standards Managers and to link said Writing Portfolio Managers with said Standards Managers;

wherein said Standards are benchmarks students are expected to meet throughout their education and identify what skill students should acquire at a particular grade level;

wherein said Standard Indicators are each associated with at least one of said Standards, detail specific task competencies which comprise said at least one of said Standards, and help determine whether said at least one of said Standards has been met;

wherein said Scrimmage Manager includes a plurality of Scrimmages associated with said Standards and said Standard Indicators, wherein each of said Scrimmages includes a plurality of Questions corresponding to each of said Scrimmages and Scrimmage Results corresponding to each of said Scrimmages; wherein each of said Scrimmages is linked to at least one of said Standards and at least one of said Standard Indicators; wherein a plurality of individual of said Scrimmages are each linked to a plurality of said Standards and to a plurality of said Standard Indicators;

wherein said Portfolio Manager includes a plurality of Portfolios associated with said Standards and said Standard Indicators, each of said Portfolios having a unique ID, each of said Portfolios having a plurality of Portfolio Entries each having a unique ID; wherein each of said Portfolio Entries is linked to at least one of said Standards and independently linked to at least one of said Standard Indicators; wherein a plurality of said Portfolio Entries are each linked to a plurality of said Standards and a plurality of said Standard Indicators;

wherein said Scrimmage Manager, said Writing Portfolio Manager, and said plurality of Standards Managers include a State, said State having a plurality of Districts, each of said Districts having a plurality of Schools, each of said Schools having a plurality of said Students, each of said Schools having a plurality of said Teachers, and each of said Schools having a plurality of Courses;

wherein each of said Courses is comprised of a plurality of Learning Objectives and a plurality of Critical Vocabulary, and wherein each of said Learning Objectives, each of said Critical Vocabulary, each of said Standards, and each of said Standard Indicators form a plurality of Unit Plans;

wherein each of said Learning Objectives, each of said Critical Vocabulary, and each of said Unit Plans has a unique ID; and wherein said Critical Vocabulary is a word or phrase necessary to understand said Standards and said Standard Indicators;

a software relational database related to said individual systems and receiving, collecting, organizing, processing, and maintaining data;

host computers for teachers and school administrations to submit data into and access data from said software relational database; and wherein said one or more individual systems within said computer server further includes a report generating process that generates a plurality of reports relevant to said data input into said software relational database and accessible by said teachers and said school administrators, wherein said plurality of reports generated is dependent upon parameters selected by said teachers and school administrations accessing said data;

wherein said plurality of reports further include reports identifying which of said Standards and Standard Indicators corresponding to a particular of said Portfolio Entries were not grased by each of said Students;

wherein said plurality of reports include reports identifying which of said Standards corresponding to a particular of said Scrimmages was grasped by each of a plurality of said Students in a class and wherein at least some of said Students may grasp multiple of said Standards.

2. The education system of claim 1, wherein said reports generated from said report generating process include Cross Application Query Reports, said report generating process generating data for said Scrimmage Manager linked with said Standards Managers, said Writing Portfolio Manager linked with said Standards Managers, and said Scrimmage Manager linked with said Writing Portfolio Manager linked with said Standards Manager.

3. The education system of claim 1, wherein said reports are generated and said data is received, collected, organized, processed, maintained, and accessed in real-time; and wherein each of said Questions is linked to at least one of said Standard Indicators; and wherein said reports further include identifying which of said Standard Indicators corresponding to a particular of said Questions were not grasped by each of said plurality of students in a single said class.

4. The education system of claim 3, wherein a plurality of said students are linked to an extracurricular activity; and wherein said reports further include reports identifying which of said Standards and Standard indicators corresponding to a particular of said Questions were not grasped by each of said students linked to said extracurricular activity.

5. The education system of claim 3, wherein said plurality of reports further include identifying which of said at least one of said Standards corresponding to a particular of said Portfolio Entries was not grasped by each of a plurality of said Students in a single said class.

6. The education system of claim 1, wherein said teachers and said school administrations access said educational software system via user-specific and school-specific identification numbers and passwords.

7. The education system of claim 1, wherein said plurality of Unit Plans may be saved as templates, said templates being accessible by said teachers and said school administrators.

8. The education system of claim 7, wherein said plurality of templates may be shared based on student results as determined from said plurality of reports.

9. The education system of claim 8, wherein each of said Questions is linked to at least one of said Standards; and wherein said reports further include identifying which of said Standards and Standard Indicators corresponding to a particular of said Questions were not grasped by each of a plurality of said students in a single said class.

10. The education system of claim 1, wherein said teachers schedule a plurality of said Scrimmages and enter said scrimmage results into said Scrimmage Manager, wherein each of said Scrimmages has a unique ID.

11. The education system of claim 10, wherein each of said Scrimmages further includes a plurality of Files; each of said Questions includes a plurality of Scoring Details and a plurality of said Standard Indicators; wherein each of said Files, said Questions, said Scoring Details, said Standard Indicators, and said Standards has a unique ID.

12. The education system of claim 11, wherein said plurality of Standard Indicators and said plurality of Standards link said Scrimmage Manager to said Standards Managers.

13. The education system of claim 1, wherein said data includes Scrimmage templates.

14. The education system of claim 13, wherein said teachers access said Scrimmage templates.

15. The education system of claim 1, wherein said teachers submit said plurality of Portfolios into said Writing Portfolio Manager.

16. The education system of claim 1, wherein a plurality of said students are linked to an extracurricular activity; and wherein said reports further include reports identifying which of said Standards and Standard indicators corresponding to a particular of said Scrimmages were not grasped by each of said students linked to said extracurricular activity.

17. The education system of claim 1, wherein each of said Portfolio Entries contains a plurality of Files, wherein each of said Files is linked to at least one Scoring Detail.

18. A computer implemented method for storing and accessing information relating to an administration of education in a database, comprising the steps of:
- a) inputting data by a plurality of users, via one or more host computers, into one or more individual systems, wherein said one or more individual systems are software components implemented within a computer server, said individual systems including a Scrimmage Manager, a Writing Portfolio Manager, and a plurality of Standards Managers, wherein
  - i) said Scrimmage Manager has the capability of storing overall quiz results from a Scrimmage, storing results for individual Questions of said Scrimmage, identifying trends among said quiz results and said Questions, linking a plurality of relevant Standards and a plurality of relevant Standard Indicators with a particular said Scrimmage, tracking and reporting progress, allowing said users to access said quiz results, generating grades, and storing quiz templates;
    wherein said Standards are benchmarks students are expected to meet throughout their education and identify what skill students should acquire at a particular grade level;
    wherein said Standard Indicators are each associated with at least one of said Standards, detail specific task competencies which comprise said at least one of said Standards, and help determine whether said at least one of said Standards has been met;
  - ii) said Writing Portfolio Manager has the capability of storing writing portfolio entries, identifying trends, tracking and reporting on progress, allowing said users to access said writing portfolio entries, and generating grades;
    wherein a plurality of said writing portfolio entries form a portfolio; wherein a plurality of said portfolio entries are each linked with a plurality of relevant of said Standards and a plurality of relevant of said Standard Indicators; and
    wherein a plurality of Scoring Details are linked with each of a plurality of said portfolios and each of a plurality of said portfolio entries independently of said relevant of said Standards and relevant of said Standard Indicators;
  - iii) said Standards Managers has the capability of identifying relevant of said Standards and relevant of said Standard Indicators to be taught at a particular class level, allowing teachers to create a plurality of Unit Plans, and tracking student progress as defined by said Standards and said Standard Indicators;
  wherein said Scrimmage Manager, said Writing Portfolio Manager, and said Standards Managers include a plurality of Districts, each of said Districts having a plurality of Schools, each of said Schools having a plurality of said students, each of said Schools having a plurality of said teachers, and each of said Schools having a plurality of courses;
  wherein each of said courses is comprised of a plurality of Learning Objectives and a plurality of Critical Vocabulary, and wherein each of said Learning Objectives, each of said Critical Vocabulary, each of said Standards, and each of said Standard Indicators form a plurality of said Unit Plans;
  wherein each of said Learning Objectives, each of said Critical Vocabulary, and each of said Unit Plans has a unique ID; and
  wherein said Critical Vocabulary is a word or phrase necessary to understand said Standards and said Standard Indicators;
- b) collecting, organizing, processing, and maintaining said data by said one or more of said individual systems within said computer server;
- c) receiving a selection by said users of one or more reports to be generated from a list of available reports;
- d) generating, via one or more of said individual systems in said computer server, said reports containing said data relevant to a set of parameters selected by said users;
  said reports including reports identifying whether said Standards and said Standard Indicators linked to a singular said Scrimmage were attained by a singular Student in a class of said students, and wherein said singular Student may attain multiple said Standards and multiple said Standard Indicators in said singular Scrimmage.

19. The computer implemented method of claim 18, wherein said reports include Application-Specific Reports, Cross-Application Query Reports, and Non-Manager Specific Reports.

20. The computer implemented method of claim 19, wherein said collecting, organizing, processing, maintaining, and generating steps are in real-time and wherein each of said Questions is linked to a relevant at least one of said plurality of Standards.

21. The computer implemented method of claim 20, wherein said parameters selected by said users include data relevant to said Scrimmage Manager, thereby generating a Scrimmage Manager Report, wherein said Scrimmage Manager Report includes identifying which relevant of said Standards corresponding to each of said Scrimmages were not grasped by said students.

22. The computer implemented method of claim 21, wherein each of said Questions is linked to a relevant at least one of said Standards and wherein said Scrimmage Manager Report includes identifying which of said Standards linked to each of said Questions were not grasped by a single of said students.

23. The computer implemented method of claim 22, wherein said parameters selected by said users include data relevant to said Writing Portfolio Manager, thereby generating a Portfolio Manager Report, wherein said Portfolio Manager Report includes identifying which of said Standards and Standards Indicators corresponding to a particular of said Writing Portfolio Entries was not grasped by each of a plurality of said Students in a single said class.

24. The computer implemented method of claim 18, wherein said parameters selected by said users include data relevant to said Standards Managers, thereby generating a Standards Manager Report, wherein said Standards Manager Report includes identifying said Critical Vocabulary to be taught at a particular class level.

25. The computer implemented method of claim 18, wherein said parameters selected by said users include data relevant to said Writing Portfolio Manager, thereby generating a Writing Portfolio Report, wherein said Writing Portfolio Report includes identifying performance trends related to said Scoring Details.

26. The computer implemented method of claim 18, wherein each of said individual systems are linked together via Standard IDs and Standard Indicator IDs.

27. The computer implemented method of claim 26, wherein said parameters selected by said users include data relevant to said Scrimmage Manager, and wherein said Standard IDs and said Standard Indicator IDs define a set of said Standards to be met and link said Scrimmage Manager with said Standards Managers, thereby generating a Scrimmage and Standards Managers Cross-Application Query Report.

28. The computer implemented method of claim 27, wherein said parameters selected by said users include data relevant to said Writing Portfolio Manager, and wherein said Standard IDs and said Standard Indicator IDs define a set of said Standards to be met and link said Writing Portfolio Manager with said Standards Managers, thereby generating a Writing Portfolio and Standards Managers Cross-Application Query Report.

29. The computer implemented method of claim 28, wherein said parameters selected by said users include data relevant to said Scrimmage Manager and said Writing Portfolio Manager, and wherein said Standard IDs and said Standard Indicator IDs define a set of said Standards to be met and link said Scrimmage Manager and said Writing Portfolio Manager with said Standards Managers, thereby generating a Scrimmage and Writing Portfolio and Standards Managers Cross-Application Query Report.

30. A system for an administration of education, comprising:
  a) a software relational database recited within a computer server, which
    i) stores one or more individual systems, said individual systems including a Scrimmage Manager for entering overall student quiz results for a quiz, accessing said quiz results, entering question results for individual Questions for said quiz, identifying trends among said quiz results and said question results, tracking and reporting progress, generating grades and storing quiz templates; a Writing Portfolio Manager for entering student writing portfolios, accessing writing portfolio entries, identifying trends among a plurality of students, tracking and reporting progress, generating grades, and storing said writing portfolio entries; and a plurality of Standards Managers for identifying relevant Standards and Standards Indicators to be taught at a class level, allowing teachers to create a plurality of Unit Plans, and tracking student progress as defined by said Standards and said Standard Indicators;
    ii) receives data related to the administration of education entered by a plurality of users;
    iii) collects, organizes, processes, and maintains said data in one or more of said individual systems;
  b) a plurality of said Standards and a plurality of said Standard Indicators for said Scrimmage Manager, said Writing Portfolio Manager, and said Standards Managers, each of said Standards and each of said Standards Indicators having a unique ID linking said Standards Managers with said Scrimmage Manager and said Writing Portfolio Manager; a plurality of Scoring Details for said Writing Portfolio Manager; wherein a plurality of said Standards and a plurality of said Standard Indicators are linked to at least one said quiz, wherein a plurality of said Standards and a plurality of said Standard Indicators are linked to at least one said writing portfolio, and wherein at least one of said Scoring Details is linked to at least one said writing portfolio independently of said Standards and said Standard Indicators;
    wherein said Standards are benchmarks students are expected to meet throughout their education and identify what skill students should acquire at a particular grade level;
    wherein said Standard Indicators are each associated with at least one of said Standards, detail specific task competencies which comprise said at least one of said Standards, and help determine whether said at least one of said Standards has been met;
    wherein said Scrimmage Manager, said Writing Portfolio Manager, and said plurality of Standards Managers include a plurality of Districts, each of said Districts having a plurality of schools, each of said Schools having a plurality of said students, each of said schools having a plurality of teachers, and each of said schools having a plurality of courses;
    wherein each of said courses is comprised of a plurality of Learning Objectives and a plurality of Critical Vocabulary, and wherein said Learning Objectives, said Critical Vocabulary, said Standards, and said Standard Indicators form a plurality of said Unit Plans;
    wherein each of said Learning Objectives, each of said Critical Vocabulary, and each of said Unit Plans has a unique ID; and
    wherein said Critical Vocabulary is a word or phrase necessary to understand said Standards and said Standard Indicators;
  c) a plurality of reports generated by said software relational database within said computer server, wherein said reports
    i) are selected, accessed, and viewed by said users;
    ii) contain data relevant to a set of parameters selected by said users; and
    iii) include Application-Specific Reports, Cross-Application Query Reports, and Non-Manager Specific Reports; wherein said Cross-Application Query Reports are generated via the linkage of said Standard IDs and said Standard Indicator IDs and include reports identifying said Standards and said Standard Indicators that were not grasped by each of a plurality of said students.

31. The system of claim 30, wherein said reports are generated and said data is received, collected, organized, processed, maintained and accessed in real time and wherein at least one of said Standards is linked to at least one of said Questions.

32. The system of claim 30, wherein said plurality of Unit Plans may be saved as templates, said templates being accessible by said users, and wherein said templates may be associated with student results.

33. The system of claim 30, wherein each of said Questions includes a plurality of said Scoring Details and said Standard Indicators; wherein each of said Questions, said Scoring Details, said Standard Indicators, and said Standards has a unique ID.

34. The system of claim 33, wherein said data includes Scrimmage templates.

35. The system of claim 34, wherein said users access said Scrimmage templates.

36. The system of claim 30, wherein said users submit a plurality of Portfolios into said Writing Portfolio Manager, each of said Portfolios having a unique ID.

37. The system of claim 36, wherein each of said Portfolios is comprised of a plurality of said Portfolio Entries; each of said Portfolio Entries includes a plurality of Files, each of said Files including at least one of said Scoring Details.

38. The system of claim 30, wherein said Application Specific Reports include:
  a) Scrimmage Manager Reports including performance trends of said students, said schools, and said districts based on said quiz results and said individual questions;
  b) Writing Portfolio Reports having data including writing portfolio scores, detailed analysis of said writing portfolio entries, and performance trends said students, said schools, and said districts based on said writing portfolios and said writing portfolio entries; and c) Standards Managers Reports having data including when and which said Standards and said Standard Indicators must be attained, and whether said Standards and said Standard Indicators were attained.

39. The system of claim 30, wherein said Cross-Application Query Reports include Scrimmage and Standards Managers Reports, Writing Portfolio and Standards Managers Reports, and Scrimmage Manager and Writing Manager and Standards Managers Reports.

40. The system of claim 39, wherein said parameters selected by said users include data relevant to said Scrimmage Manager, and wherein said Standard IDs and said Standard Indicator IDs define a set of said Standards to be met and link said Scrimmage Manager with said Standards Managers, thereby generating said Scrimmage and Standards Managers Reports.

41. The system of claim 39, wherein said parameters selected by said users include data relevant to said Writing Portfolio Manager, and wherein said Standard IDs and said Standard Indicator IDs define a set of said Standards to be met and link said Writing Portfolio Manager with said Standards Managers, thereby generating said Writing Portfolio and Standards Managers Reports.

42. The system of claim 39, wherein said parameters selected by said users include data relevant to said Scrimmage Manager and said Writing Portfolio Manager, and wherein said Standard IDs and said Standard Indicator IDs define a set of said Standards to be met and link said Scrimmage Manager and said Writing Portfolio Manager with said Standards Managers, thereby generating said Scrimmage and Writing Portfolio and Standards Managers Reports.

43. A computer implemented method for storing and accessing data in a database related to an administration of education, comprising the steps of:

a) receiving, via one or more host computers, data related to the administration of education that has been entered by a plurality of users into a plurality of subsystems, said subsystems including a first subsystem, a second subsystem, and a third subsystem; wherein said subsystems are software components implemented within a computer server;

b) receiving, organizing, and storing said data with said subsystems within said computer server; wherein said first subsystem, said second subsystem, and said third subsystem each have a plurality of Standards and a plurality of Standard Indicators, each of said Standards and each of said Standards Indicators having a unique ID to link said first subsystem with said second subsystem and to link said first subsystem with said third subsystem;

c) receiving, via said one or more host computers, a selection by said users of a plurality of reports, said reports including reports from said first subsystem, reports from said second subsystem, reports from said third subsystem, cross-application query reports from said first subsystem and said second subsystem, cross-application query reports from said first subsystem and said third subsystem, and cross-application query reports from said first subsystem and said second subsystem and said third subsystem; and wherein said users schedule a plurality of Scrimmages and enter Scrimmage results for each of said Scrimmages into said second subsystem, wherein each of said Scrimmages has a unique ID, a plurality of Questions, and a plurality of said Standards;

wherein said Standards are benchmarks students are expected to meet throughout their education and identify what skill students should acquire at a particular grade level;

wherein said Standard Indicators are each associated with at least one of said Standards, detail specific task competencies which comprise said at least one of said Standards, and help determine whether said at least one of said Standards has been met;

wherein each of said Questions includes at least one of a plurality of Scoring Details; wherein each of said Questions and said Scoring Details has a unique ID;

wherein said subsystems include a plurality of Districts, each of said Districts having a plurality of Schools, each of said Schools having a plurality of said Students, each of said Schools having a plurality of Teachers, and each of said Schools having a plurality of Courses;

wherein each of said Courses is comprised of a plurality of Learning Objectives and a plurality of Critical Vocabulary, and wherein said Learning Objectives, said Critical Vocabulary, said Standards, and said Standard Indicators form a plurality of Unit Plans;

wherein each of said Learning Objectives, each of said Critical Vocabulary, and each of said Unit Plans has a unique ID; and wherein said Critical Vocabulary is a word or phrase necessary to understand said Standards and said Standard Indicators;

d) generating, via said subsystem within said computer server, said reports selected by said user, wherein i) said reports are accessed and reviewed by said users;

ii) said reports contain data relevant to a set of parameters selected by said users; and iii) said cross-application query reports are generated via the linkage of said Standards IDs and said Standard Indicator IDs;

wherein said reports include reports identifying trends related to said at least one of a plurality of Scoring Details corresponding to said Questions across individual Students of a plurality of Students in a class; and wherein said reports include reports identifying trends related to said Standards corresponding to said Scrimmages across said individual Students of said Students in said class.

44. The method of claim 43, wherein said Unit Plans may be saved as templates, said templates being accessible by said users.

45. The method of claim 43, wherein said data includes Scrimmage templates.

46. The method of claim 45, wherein said users access said Scrimmage templates.

47. The method of claim 43, wherein student writing portfolios are submitted into said third subsystem.

48. The method of claim 47, wherein each of said student writing Portfolios is comprised of a plurality of Portfolio Entries.

49. The method of claim 43, wherein said second subsystem is a Scrimmage Manager for accessing said Scrimmage results, identifying trends, tracking and reporting progress, generating grades, and storing quiz templates; wherein each of said users may access said quiz templates and wherein each of said quiz templates has a plurality of said Questions each linked with at least one of said Standards and at least one of said Standard Indicators.

50. The method of claim 49, wherein said parameters selected by said users include data relevant to said Scrimmage Manager, thereby generating said Scrimmage Manager Report; wherein said Scrimmage Manager Report includes identifying which of said questions were not grasped by each of a plurality of said students in said class on a particular said Scrimmage.

51. The method of claim 43, wherein said first subsystem is a plurality of Standards Managers for identifying said Standards and said Standard Indicators to be taught at a particular class level, allowing said teachers to create a plurality of said Unit Plans, and tracking student progress as defined by said Standards and said Standard Indicators.

52. The method of claim 51, wherein said parameters selected by said users include data relevant to said Standards Managers and said Scrimmage Manager, thereby generating a Cross Application Query Report; wherein said Cross Application Query Report includes identifying which of said Standards and said Standard Indicators were not grasped by each of a plurality of said students on a particular said Scrimmage.

53. The method of claim 52, further comprising the steps of allowing said teachers to save said Unit Plans as Unit Plan Templates, tracking student progress as defined by said Standards and said Standard Indicators, and sharing said Unit Plan Templates based on class results as determined from said Cross Application Query Reports.

54. The method of claim 53, wherein said parameters selected by said users include data relevant to said Scrimmage Manager, thereby generating said Scrimmage Manager Report; wherein said Scrimmage Manager Report includes identifying which of said questions were not grasped by each of a plurality of said students in a single said class on a particular said Scrimmage.

55. The method of claim 54, wherein said third subsystem is a Writing Portfolio Manager for entering student writing portfolios, accessing said writing portfolio entries, identifying trends, tracking and reporting progress, generating grades, and storing said writing portfolio entries, wherein said writing portfolio entries are each linked with a plurality of said Standards and said Standard Indicators.

56. The method of claim 43, wherein said third subsystem is a Writing Portfolio Manager for entering student writing portfolios, accessing writing portfolio entries, identifying trends, tracking and reporting progress, generating grades, and storing said writing portfolio entries, wherein said writing portfolio entries each have a plurality of said Standards and said Standard Indicators and a plurality of said Scoring Details, said Scoring Details being independent of said Standards and Standard Indicators.

57. The method of claim 56, wherein said parameters selected by said users include data relevant to said Writing Portfolio Manager, thereby generating said Writing Portfolio Report; wherein said Writing Portfolio Report includes identification of Scoring Details trends among a plurality of students.

58. The method of claim 43, wherein said parameters selected by said users include data relevant to said second subsystem, and wherein said Standard IDs and said Standard Indicator IDs define a set of said Standards to be met and link said second subsystem with said first subsystem, thereby generating said cross-application query reports from said first subsystem and said second subsystem.

59. The method of claim 43, wherein said parameters selected by said users include data relevant to said third subsystem, and wherein said Standard IDs and said Standard Indicator IDs define a set of said Standards to be met and link said third subsystem with said first subsystem, thereby generating said cross-application query reports from said first subsystem and said third subsystem.

60. The method of claim 43, wherein said parameters selected by said users include data relevant to said second subsystem and said first subsystem, and wherein said Standard IDs and said Standard Indicator IDs define a set of said Standards to be met and link said second subsystem and said third subsystem with said first subsystem, thereby generating said cross-application query reports from said first subsystem and said second subsystem and said third subsystem.

61. A computer implemented method for storing and accessing data in a database related to an administration of education, comprising the steps of:

entering data, via one or more host computers, representing a plurality of student portfolio entries in a third subsystem of a relational computer database stored within a computer system;

entering data, via said one or more host computers, representing a plurality of student test entries into a second subsystem of said relational computer database;

associating with each of said plurality of student portfolio entries on said third subsystem a plurality of Standards and a plurality of Standard Indicators originating from a first subsystem of said relational computer database;

wherein said Standards are benchmarks students are expected to meet throughout their education and identify what skill students should acquire at a particular grade level;

wherein said Standard Indicators are each associated with at least one of said Standards, detail specific task competencies which comprise said at least one of said Standards, and help determine whether said at least one of said Standards has been met;

wherein said first subsystem, said second subsystem, and said third subsystem includes a plurality of Districts, each of said Districts having a plurality of Schools, each of said Schools having a plurality of Students, each of said Schools having a plurality of Teachers, and each of said Schools having a plurality of Courses;

wherein each of said Courses is comprised of a plurality of Learning Objectives and a plurality of Critical Vocabulary, and wherein each of said Learning Objectives, each of said Critical Vocabulary, each of said Standards, and each of said Standard Indicators form a plurality of Unit Plans;

wherein each of said Learning Objectives, each of said Critical Vocabulary, and each of said Unit Plans has a unique ID; and wherein said Critical Vocabulary is a word or phrase necessary to understand said Standards and said Standard Indicators;

independently associating at least one of a plurality of Scoring Details with a plurality of said student portfolio entries on said third subsystem;

associating with each of said plurality of student test entries on said second subsystem at least one of said Standards and a plurality of said Standard Indicators originating from said first subsystem;

wherein said test entries each include a plurality of questions and student quiz results; wherein a plurality of individual of said test entries are each linked to a plurality of said Standards and a plurality of said Standard Indicators; and wherein a plurality of individual of said test entries contain less said Standards than said questions;

independently associating at least one of a plurality of said Scoring Details with a plurality of said student test entries on said second subsystem; and generating, via said computer system, a plurality of reports as selected by users, said reports including cross-application query reports from said first subsystem and said third subsystem, from said first subsystem and said second subsystem, and from said first subsystem and said second subsystem and said third subsystem.

62. The method of claim 61, wherein said step of generating a plurality of reports is facilitated by said association of said Standards IDs and Standard Indicator IDs to said plurality of student portfolio entries and said plurality of student test entries.

63. The method of claim 62, wherein said second subsystem is a Scrimmage Manager for entering said student quiz results, accessing said student quiz results, identifying trends, tracking and reporting progress, generating grades, and storing quiz templates; wherein each of said users may access said quiz templates and wherein each of said quiz templates has a plurality of said questions each linked with at least one of said Standards and at least one of said Standard Indicators.

64. The method of claim 62, wherein said first subsystem is a plurality of Standards Managers for identifying said Standards and said Standard Indicators to be taught at a particular class level, identifying benchmarks to be met, allowing said teachers to create a plurality of said Unit Plans, and tracking student progress as defined by said Standards and said Standard Indicators.

65. The method of claim 64, wherein said third subsystem is a Writing Portfolio Manager for entering student writing portfolios, accessing said student portfolio entries, identifying trends among a plurality of said students based on said Standards and said Standard Indicators, tracking and reporting progress, generating grades, and storing said student portfolio entries.

66. The method of claim 61, wherein said data representing a plurality of student test entries includes data for individual questions of said questions.

67. The method of claim 66, further comprising the step of associating with each of said individual questions at least one of said Standards and said Standard Indicators originating from said first subsystem.

68. The method of claim 67, wherein said first subsystem is a Standards Manager for identifying said Standards and said Standard Indicators to be taught at a particular class level, identifying benchmarks to be met, allowing said teachers to create a plurality of said Unit Plans, allowing said teachers to save said plurality of Unit Plans as Unit Plan Templates, and tracking student progress as defined by said Standards and said Standard Indicators.

69. The method of claim 68, further comprising the step of sharing said Unit Plan Templates based on student results as determined from said report generating process.

\* \* \* \* \*